United States Patent
Saji et al.

(10) Patent No.: US 10,630,186 B2
(45) Date of Patent: Apr. 21, 2020

(54) SWITCHING POWER SUPPLY DEVICE AND SEMICONDUCTOR DEVICE

(71) Applicant: PANASONIC INTELLECTUAL PROPERTY MANAGEMENT CO., LTD., Osaka (JP)

(72) Inventors: Takashi Saji, Shiga (JP); Toshifumi Ishida, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/282,735

(22) Filed: Feb. 22, 2019

(65) Prior Publication Data

US 2019/0190388 A1     Jun. 20, 2019

Related U.S. Application Data

(63) Continuation of application No. PCT/JP2017/030031, filed on Aug. 23, 2017.

(30) Foreign Application Priority Data

Aug. 30, 2016 (JP) .................... 2016-168485

(51) Int. Cl.
  *H02M 3/335* (2006.01)
  *H02M 3/28* (2006.01)

(52) U.S. Cl.
  CPC ......... *H02M 3/33507* (2013.01); *H02M 3/28* (2013.01); *H02M 3/33523* (2013.01)

(58) Field of Classification Search
  CPC ......... H02M 3/33507; H02M 3/33523; H02M 3/33569; H02M 3/33576; H02M 1/08;
(Continued)

(56) References Cited

U.S. PATENT DOCUMENTS

| | | | |
|---|---|---|---|
| 8,335,097 B2* | 12/2012 | Yamashita | H02M 3/33507 363/21.13 |
| 9,030,849 B2* | 5/2015 | Yamashita | H02M 1/36 323/285 |

(Continued)

FOREIGN PATENT DOCUMENTS

| | | |
|---|---|---|
| JP | 2005-080336 A | 3/2005 |
| JP | 2005-168084 A | 6/2005 |

(Continued)

OTHER PUBLICATIONS

International Search Report and Written Opinion, dated Oct. 17, 2017 in International Application No. PCT/JP2017/030031; with partial English translation.

*Primary Examiner* — Yemane Mehari
(74) *Attorney, Agent, or Firm* — McDermott Will & Emery LLP

(57) ABSTRACT

A switching power supply circuit includes an intermittent oscillation control circuit, which performs intermittent oscillation control that repeats a cycle including an oscillation time period and a stop time period according to a feedback signal so that output voltage or current becomes constant, compares an intermittent oscillation period that is a sum of the oscillation time period and the stop time period with a preset target period, sets the oscillation time period of current cycle to a length obtained by extending the oscillation time period of previous cycle by first predetermined time when the intermittent oscillation period is shorter than the target period, and sets the oscillation time period of current cycle to a length obtained by subtracting second predetermined time from the oscillation time period of previous cycle when the intermittent oscillation period is longer than the target period, in each cycle of intermittent oscillation control.

11 Claims, 16 Drawing Sheets

(58) Field of Classification Search
CPC .... H02M 1/36; H02M 1/4208; H02M 1/4225; H02M 1/44; H02M 2001/0006; H02M 2001/0009; H02M 2001/0032; H02M 7/48; H02M 7/122; Y02B 70/128; Y02B 70/1433; Y02B 70/1441; Y02B 70/1475
USPC ............. 363/21.01–21.18, 56.1, 89; 323/282
See application file for complete search history.

(56) References Cited

U.S. PATENT DOCUMENTS

| | | | | |
|---|---|---|---|---|
| 9,184,664 | B2* | 11/2015 | Saji | H02M 1/44 |
| 2004/0264221 | A1* | 12/2004 | Mori | H02M 3/33523 |
| | | | | 363/39 |
| 2008/0084723 | A1 | 4/2008 | Balakrishnan et al. | |
| 2009/0097284 | A1 | 4/2009 | Takei et al. | |
| 2009/0103338 | A1 | 4/2009 | Nakamura | |
| 2009/0147547 | A1* | 6/2009 | Yamashita | H02M 3/33507 |
| | | | | 363/21.16 |
| 2010/0309690 | A1* | 12/2010 | Kawabe | H02M 3/33507 |
| | | | | 363/21.01 |
| 2010/0321963 | A1* | 12/2010 | Yamashita | H02M 3/33507 |
| | | | | 363/21.17 |
| 2011/0267024 | A1 | 11/2011 | Halberstadt | |
| 2013/0051088 | A1* | 2/2013 | Yamashita | H02M 1/36 |
| | | | | 363/21.13 |
| 2014/0036552 | A1* | 2/2014 | Saji | H02M 1/44 |
| | | | | 363/21.17 |
| 2014/0328090 | A1* | 11/2014 | Takahashi | H02M 3/33507 |
| | | | | 363/21.17 |
| 2019/0190391 | A1* | 6/2019 | Takahashi | H02M 3/33507 |

FOREIGN PATENT DOCUMENTS

| | | |
|---|---|---|
| JP | 2008-092793 A | 4/2008 |
| JP | 2009-100498 A | 5/2009 |
| JP | 2009-100591 A | 5/2009 |
| JP | 2011-004550 A | 1/2011 |
| JP | 2012-191735 A | 10/2012 |
| JP | 5845452 B2 | 1/2016 |
| WO | 2011/158282 A1 | 12/2011 |

* cited by examiner

SWITCHING POWER SUPPLY DEVICE AND SEMICONDUCTOR DEVICE

CROSS REFERENCE TO RELATED APPLICATIONS

This application is a U.S. continuation application of PCT International Patent Application Number PCT/JP2017/030031 filed on Aug. 23, 2017, claiming the benefit of priority of Japanese Patent Application Number 2016-168485 filed on Aug. 30, 2016, the entire contents of which are hereby incorporated by reference.

BACKGROUND

1. Technical Field

The present disclosure relates to a switching power supply device including intermittent oscillation control in order to improve the power supply efficiency during light load, and a semiconductor device forming the switching power supply device.

2. Description of the Related Art

A switching power supply device is widely used in electronic devices such as home appliances and office appliances for the purpose of enhancement in power conversion efficiency, downsizing, and the like. The switching power supply device controls the output voltage and the like with use of switching operation performed by a switching element and the like of a semiconductor, and supplies power to a load.

In the switching power supply device as above, improvement of the power supply efficiency during light load is strongly requested so that power consumption of the electronic device during operation standby is reduced.

In general, switching loss due to switching operation is dominant in the energy loss in the switching power supply device during light load. Examples of well-known features for improving the power supply efficiency during light load include intermittent oscillation control.

The intermittent oscillation frequency of the intermittent oscillation control is lower than the switching frequency, and hence is within an audible frequency range of 20 kHz or below in many cases. As a result, audible noise may be generated.

As measures against audible noise, the bonding or impregnation of a transformer is conceived. However, taking measures by the transformer leads to an increase in costs.

As a related art for improving the problem as above, there is a related art disclosed in U.S. Unexamined Patent Application Publication No. 2011/0267024, for example. A switching power supply device disclosed in U.S. Unexamined Patent Application Publication No. 2011/0267024 adjusts the intermittent oscillation period by calculating a desired intermittent oscillation time period according to the load and controlling the intermittent oscillation time period so that the desired intermittent oscillation period is obtained. For example, by setting the desired intermittent oscillation period to 1 ms, the intermittent oscillation frequency becomes 1 kHz, and the audible noise can be suppressed.

SUMMARY

However, in the switching power supply device of the related art as disclosed in U.S. Unexamined Patent Application Publication No. 2011/0267024, when there is load fluctuation during the intermittent oscillation control, the calculation result of the desired intermittent oscillation time period also significantly changes. Thus, there is a fear that the control becomes unstable. Further, when unstable control is repeated, the frequency component of the audible frequency range increases, and there is a fear that audible noise is generated. In U.S. Unexamined Patent Application Publication No. 2011/0267024, an addition of a filter circuit is disclosed as measures against unstable control. However, the addition leads to the complication of control and the increase of the circuit scale.

The present disclosure has been made in order to solve the abovementioned problem, and an object thereof is to provide a switching power supply device and a semiconductor device capable of effectively reducing audible noise due to load fluctuation during intermittent oscillation control while suppressing the increase of the circuit scale and suppressing the complication of control in a switching power supply device that performs intermittent oscillation control during light load.

In order to solve the abovementioned problem, the switching power supply device according to the present disclosure is a switching power supply device, including: an energy conversion circuit to which an input voltage is input, the input voltage being a direct current input voltage; a rectifying and smoothing circuit that rectifies and smooths a voltage output from the energy conversion circuit, and outputs an output voltage to a load; a switching element connected to the energy conversion circuit, the switching element switching the input voltage; a switching control circuit that controls switching operation of the switching element; and an output state detection circuit that outputs a feedback signal in accordance with one of the output voltage and an output current flowing through the load, wherein: the switching control circuit includes an intermittent oscillation control circuit that performs intermittent oscillation control in which a cycle including an oscillation time period in which the switching element performs switching operation and a stop time period in which the switching operation stops is repeated in accordance with the feedback signal so that one of the output voltage and the output current becomes constant; and the intermittent oscillation control circuit compares an intermittent oscillation period that is a sum of the oscillation time period and the stop time period with a target period that is preset, sets the oscillation time period of a current cycle to a length obtained by extending the oscillation time period of a previous cycle by a first predetermined time when the intermittent oscillation period is shorter than the target period, and sets the oscillation time period of the current cycle to a length obtained by subtracting a second predetermined time from the oscillation time period of the previous cycle when the intermittent oscillation period is longer than the target period, in each cycle of the intermittent oscillation control.

According to the switching power supply device of one aspect of the present disclosure, the audible noise can be suppressed by controlling the intermittent oscillation time period on the basis of the result obtained by comparing the intermittent oscillation period with the intermittent oscillation period target value. Further, also for the load fluctuation during the intermittent oscillation control, the change amount of the intermittent oscillation time period is only the increase or the decrease of a preset amount, and a circuit for control stabilization does not need to be added.

Furthermore, the intermittent oscillation control circuit may include a comparator that sets the oscillation time period of the current cycle by comparing a voltage of a capacitive element that is charged or discharged from start of the oscillation time period of the current cycle and an oscillation time period setting voltage; and the oscillation time period setting voltage may increase or decrease from a voltage value of the capacitive element stored when the oscillation time period of the previous cycle terminates by a predetermined voltage amount corresponding to one of the first predetermined time and the second predetermined time.

According to the switching power supply device of one aspect of the present disclosure, the intermittent oscillation control can be realized with a simple circuit.

Furthermore, one of the first predetermined time and the second predetermined time may be set within a range of from ½ times to two times a switching operation period of the switching element.

According to the switching power supply device of one aspect of the present disclosure, the first predetermined time or the second predetermined time corresponds to one switching operation of the switching element, and intermittent oscillation control that is more stable becomes possible.

Furthermore, one of the first predetermined time and the second predetermined time may be set in accordance with a count amount of the number of times of the switching operation of the switching element.

According to the switching power supply device of one aspect of the present disclosure, the first predetermined time or the second predetermined time can be set without considering the production tolerance.

Furthermore, the count amount may be one.

According to the switching power supply device of one aspect of the present disclosure, the first predetermined time or the second predetermined time corresponds to one switching operation of the switching element, and intermittent oscillation control that is more stable becomes possible.

Furthermore, the intermittent oscillation control circuit may include an intermittent oscillation period modulator that periodically changes the intermittent oscillation period within a range of from a first period to a second period.

According to the switching power supply device of one aspect of the present disclosure, the intermittent oscillation frequency can be dispersed and the effect of suppressing audible noise can be enhanced.

Furthermore, the intermittent oscillation period modulator may periodically change the target period within a range of from a third period to a fourth period that are preset.

According to the switching power supply device of one aspect of the present disclosure, the intermittent oscillation frequency can be effectively dispersed.

Furthermore, the intermittent oscillation period modulator may change the target period each time the intermittent oscillation period reaches the target period; and the target period may be alternately changed to one of the third period and the fourth period.

According to the switching power supply device of one aspect of the present disclosure, the intermittent oscillation frequency can be dispersed with a simple circuit.

Furthermore, the intermittent oscillation period modulator may periodically change a threshold value for setting a peak value of current flowing through the switching element within a range of from a first threshold value to a second threshold value that are preset.

According to the switching power supply device of one aspect of the present disclosure, the discreteness of the supplied energy in each cycle of the intermittent oscillation control is improved, and the intermittent oscillation frequency can be dispersed.

Furthermore, a semiconductor device may include: a semiconductor substrate; and the switching control circuit in the switching power supply device, disposed as an integrated circuit on the semiconductor substrate.

According to the semiconductor device of one aspect of the present disclosure, the number of parts of the switching power supply device can be significantly reduced, and downsizing, weight saving, and cost reduction can be easily realized.

As described above, according to one aspect of the present disclosure, the switching power supply device in which the audible noise generated from parts such as a transformer and a ceramic capacitor during the intermittent oscillation control can be effectively reduced and control does not become unstable even when there is load fluctuation can be realized with a relatively simple circuit configuration.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS (Knowledge that Provides a Basis for the Present Disclosure)

The inventors of the present disclosure have found that there are following problems in the switching power supply device disclosed in the "BACKGROUND" section.

Figure 14:
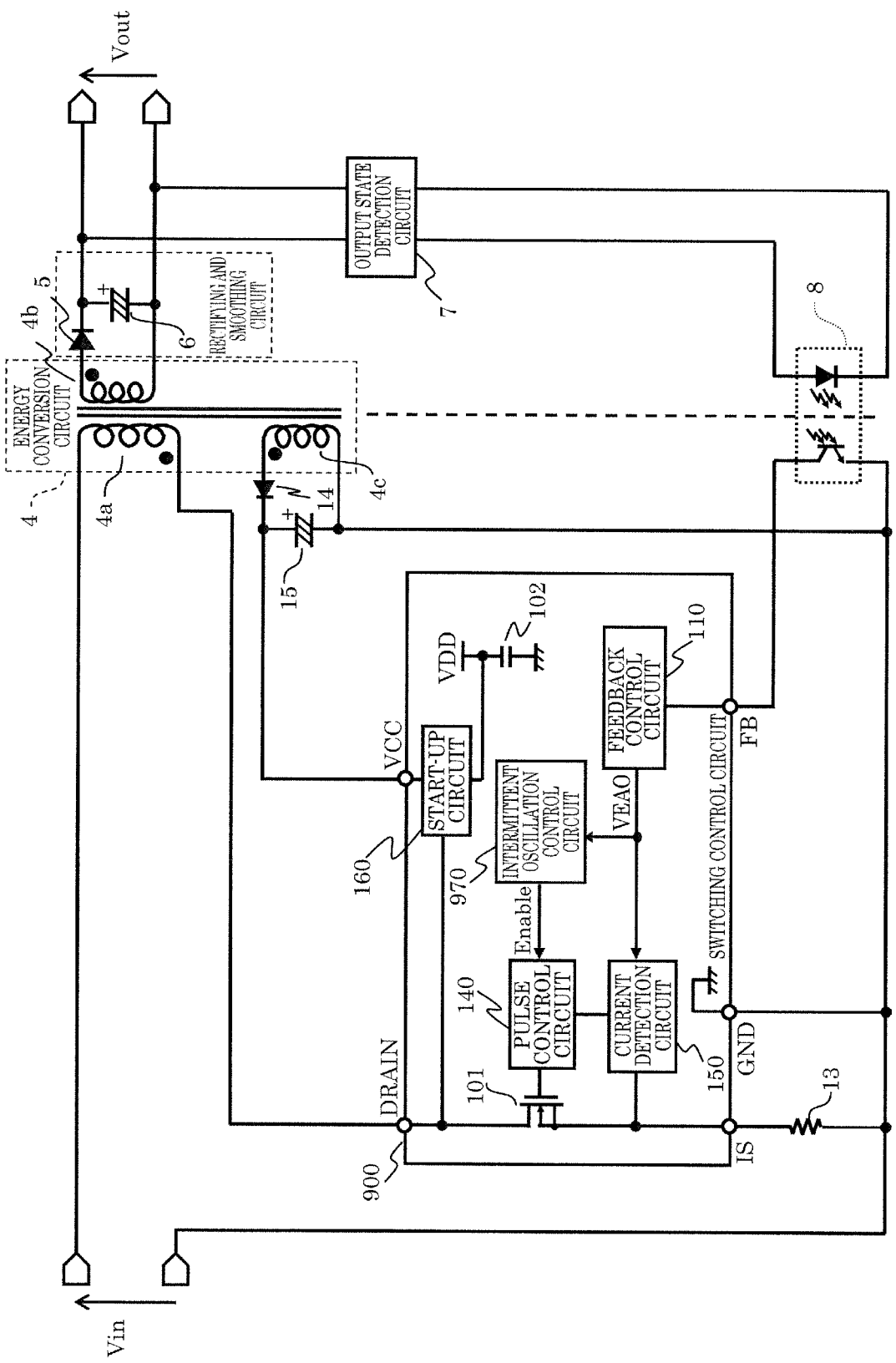
FIG. 14 is a circuit diagram illustrating a configuration example of a switching power supply device in a comparative reference example.
Figure 15:
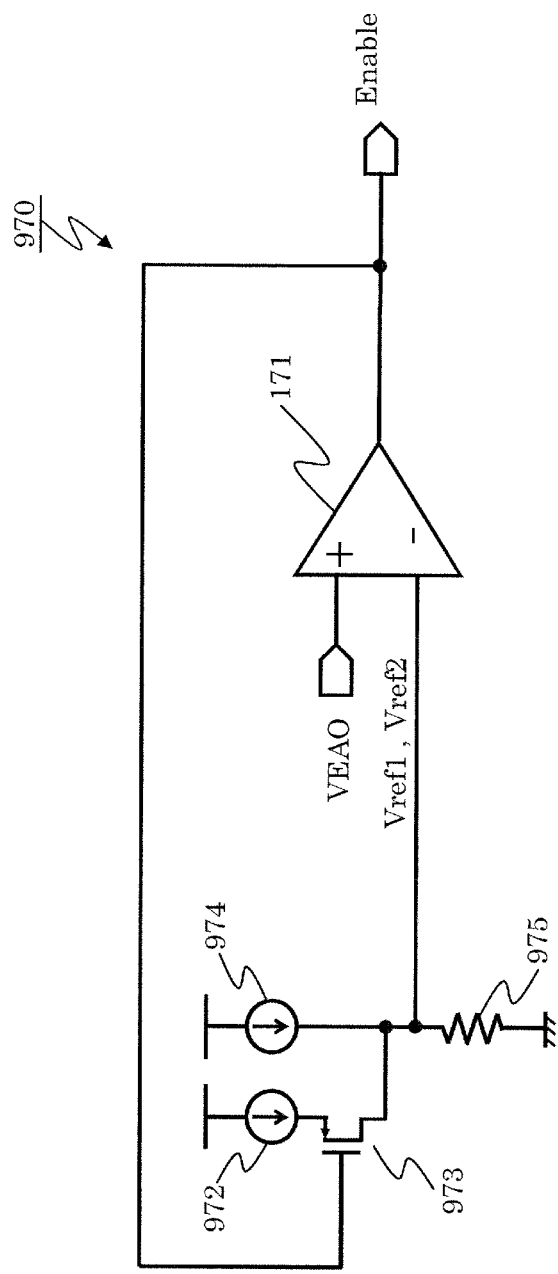
FIG. 15 is a circuit diagram illustrating a configuration example of an intermittent oscillation control circuit in the comparative reference example.

FIG. 14 is a circuit diagram illustrating an example of a switching power supply device in a comparative reference example. The switching power supply device illustrated in FIG. 14 includes intermittent oscillation control circuit 970 illustrated in FIG. 15 in switching control circuit 900. Intermittent oscillation control circuit 970 performs intermittent oscillation control. In the intermittent oscillation control, a light-load state is detected with use of a control signal VEAO that changes in accordance with an FB terminal current, and an intermittent oscillation time period and an intermittent stop time period are repeated.

Figure 16:
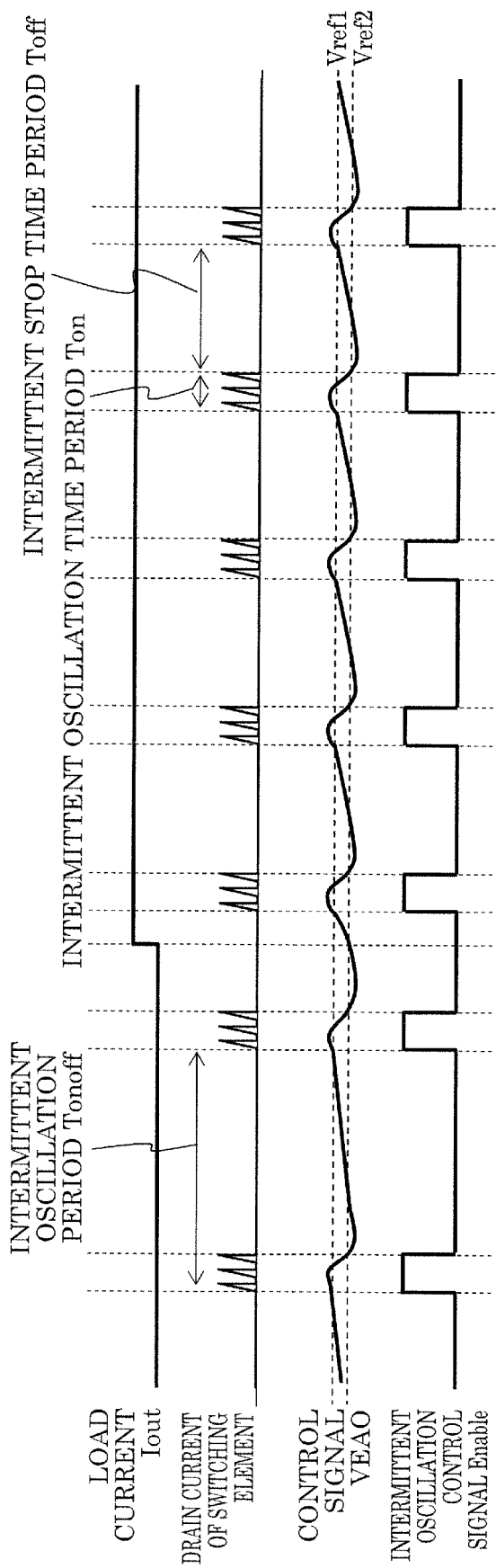
FIG. 16 is a timing chart illustrating an operation example of intermittent oscillation control in the switching power supply device in the comparative reference example.

FIG. 16 is a timing chart illustrating operation waveforms during the intermittent oscillation control in the switching power supply device in FIG. 14. Intermittent oscillation control circuit 970 generates an intermittent oscillation control signal Enable by comparing the control signal VEAO and reference voltages (two voltages, that is, Vref1 and Vref2 here) having hysteresis. For the intermittent oscillation control signal Enable, the high-level time period is referred to as an intermittent oscillation time period Ton and the low-level time period is referred to as an intermittent stop time period Toff. As a result, intermittent oscillation control circuit 970 realizes intermittent oscillation control in which an intermittent oscillation period Tonoff formed by the intermittent oscillation time period Ton and the intermittent stop time period Toff is repeated. As the load becomes lighter, the intermittent stop time period Toff becomes longer. When the number of times of the switching per certain time period is reduced, the power supply efficiency is improved. Note that, when the PWM control of the current mode is executed with a switching frequency of 25 kHz during normal operation, for example, the switching frequency in the intermittent oscillation time period Ton is also performed at 25 kHz.

In the operation as above, the intermittent oscillation frequency (a reciprocal of the intermittent oscillation period Tonoff) of the intermittent oscillation control formed by the intermittent oscillation time period Ton and the intermittent stop time period Toff is lower than the switching frequency. Therefore, the intermittent oscillation frequency is in the audible frequency range, that is, 20 kHz and below in many cases. As a result, a sound may be generated from a transformer and a capacitor used in the switching power supply device. In particular, for a ferrite core transformer that is commonly used, audible noise undesirable for the electronic device may be generated within the range of from 5 kHz to 15 kHz due to mechanical resonance.

As measures against audible noise, the bonding or impregnation of a transformer is conceived. However, taking measures by the transformer leads to an increase in costs.

As a related art for improving audible noise, there is a related art disclosed in U.S. Unexamined Patent Application Publication No. 2011/0267024, for example. The switching power supply device disclosed in U.S. Unexamined Patent Application Publication No. 2011/0267024 adjusts the intermittent oscillation period by calculating a desired intermittent oscillation time period according to the load and controlling the intermittent oscillation time period so that the desired intermittent oscillation period is obtained. For example, by setting the desired intermittent oscillation period to 1 ms, the intermittent oscillation frequency becomes 1 kHz, and the audible noise can be suppressed.

However, in the switching power supply device of the related art as disclosed in U.S. Unexamined Patent Application Publication No. 2011/0267024, when there is load fluctuation during the intermittent oscillation control, the calculation result of the desired intermittent oscillation time period also significantly changes. Thus, there is a fear that the control becomes unstable.

Further, when unstable control is repeated, the frequency component of the audible frequency range increases, and there is a fear that audible noise is generated.

In U.S. Unexamined Patent Application Publication No. 2011/0267024, an addition of a filter circuit is disclosed as measures against unstable control. However, the addition leads to the complication of control and the increase of the circuit scale.

Therefore, the present disclosure has been made in order to solve the abovementioned problem, and an object thereof is to provide a switching power supply device and a semiconductor device capable of effectively reducing audible noise due to load fluctuation during intermittent oscillation control while suppressing the increase of the circuit scale and suppressing the complication of control in a switching power supply device that performs intermittent oscillation control during light load.

The switching power supply device and the semiconductor device of the present disclosure are described below with reference to the drawings. Note that detailed descriptions may be omitted. For example, detailed description of a feature that is already well known and overlapping descriptions of configurations that are substantially the same may be omitted. The omission as above is performed to avoid the description below to be needlessly long and to make the description easy for a person skilled in the art to understand.

Note that the accompanying drawings and the description below are provided so that a person skilled in the art would sufficiently understand the present disclosure. It is not intended to limit the subject matter of the claims by the accompanying drawings and the description below.

Embodiment 1

A switching power supply device and a semiconductor device according to Embodiment 1 are specifically described below with reference to FIG. 1 to FIG. 5.

Figure 1:
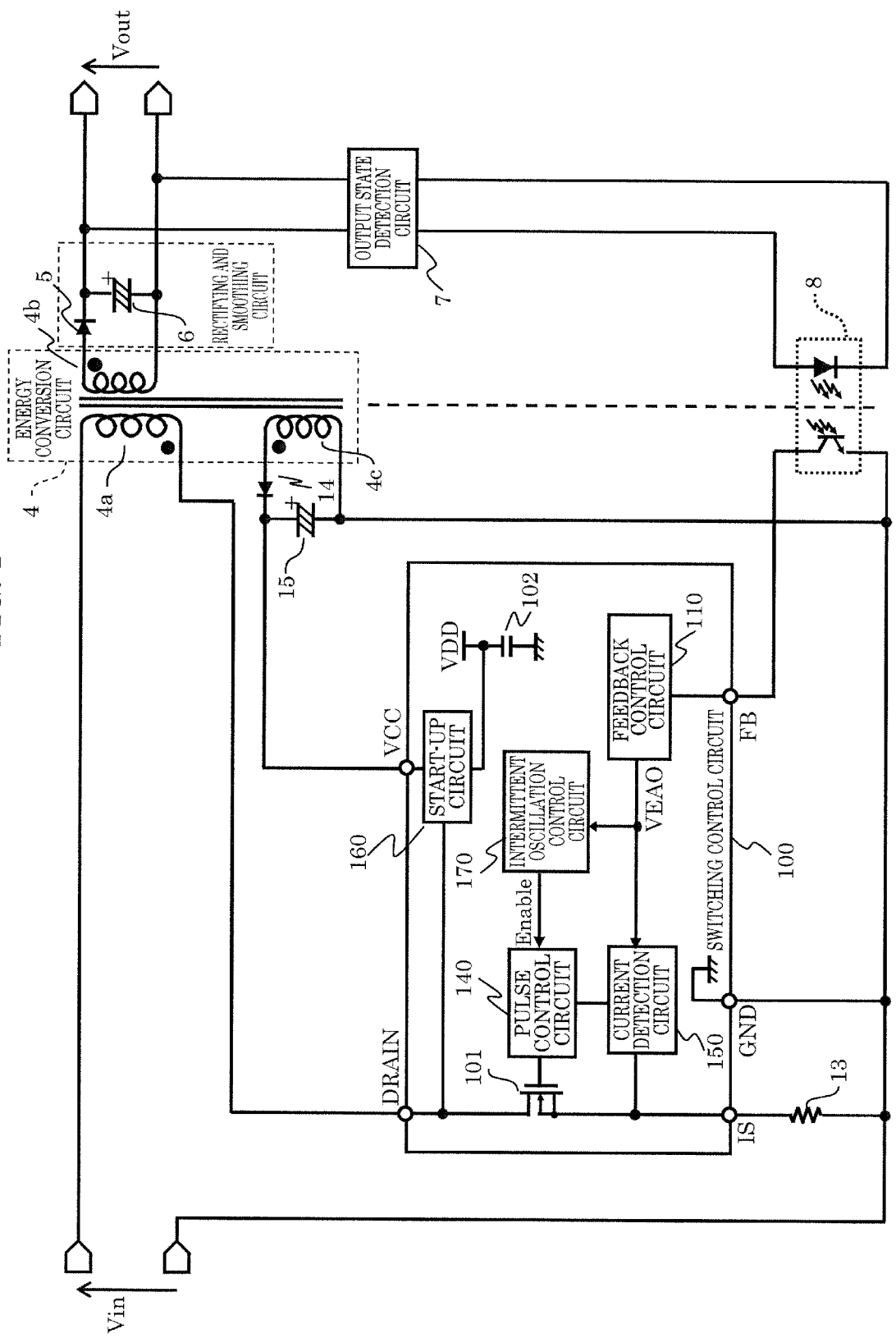
FIG. 1 is a circuit diagram illustrating a configuration example of a switching power supply device according to Embodiment 1.

FIG. 1 is a circuit diagram illustrating a configuration of the switching power supply device including the semiconductor device for switching control of Embodiment 1.

In FIG. 1, the switching power supply device includes transformer 4, rectifier diode 5, smoothing capacitor 6, output state detection circuit 7, photocoupler 8, resistor 13, rectifier diode 14, smoothing capacitor 15, and switching control circuit 100.

Transformer 4 is an energy conversion circuit including primary winding 4a, secondary winding 4b, and auxiliary winding 4c. Primary winding 4a and secondary winding 4b have opposite polarities. The switching power supply device is a flyback-type.

The high-potential side of an input terminal of the switching power supply device and switching element 101 that forms a part of switching control circuit 100 are connected to primary winding 4a. By changing the voltage signal applied to a drive electrode (gate) of switching element 101, the switching operation of switching element 101 is controlled.

A rectifying and smoothing circuit formed by rectifier diode 5 and smoothing capacitor 6 is connected to secondary winding 4b. An output voltage Vout is generated by rectifying and smoothing the flyback voltage generated across secondary winding 4b by the switching operation.

Switching control circuit 100 including switching element 101 is formed on a semiconductor substrate, and forms one semiconductor device for switching control. Switching element 101 is formed by a power MOSFET and the like.

Note that, in switching control circuit 100, the parts other than switching element 101 and switching element 101 may be provided on the same semiconductor substrate or may be provided on different semiconductor substrates. For example, on one semiconductor substrate on which the parts other than switching element 101 are arranged in switching control circuit 100, an output terminal for outputting a driving signal from those parts may be provided and connected to a gate of switching element 101 arranged on another semiconductor substrate. Further, switching element 101 and the parts other than switching element 101 may be formed so as to be separated from each other as two or more semiconductor devices.

Switching control circuit 100 includes five terminals as external input/output terminals, that is, a DRAIN terminal, a VCC terminal, an FB terminal, an IS terminal, and a GND terminal. Further, for example, switching control circuit 100 is formed by switching element 101, smoothing capacitor 102, feedback control circuit 110, pulse control circuit 140, current detection circuit 150, start-up circuit 160, intermittent oscillation control circuit 170, and the like.

The DRAIN terminal is a connection point between primary winding 4a of transformer 4 and switching element 101, that is, a terminal connected to a drain of switching element 101.

The VCC terminal is a terminal connecting an output of a rectifying and smoothing circuit formed by rectifier diode 14 and smoothing capacitor 15 connected to auxiliary winding 4c of transformer 4 and start-up circuit 160 built in switching control circuit 100 with each other. Further, the VCC terminal is a terminal that rectifies and smooths the flyback voltage generated across auxiliary winding 4c by the switching operation of switching element 101, and supplies power to switching control circuit 100 as control power supply voltage VCC.

The FB terminal is a terminal for inputting a feedback signal (for example, current and the like from photocoupler 8) output from output state detection circuit 7 to feedback control circuit 110 of switching control circuit 100.

The IS terminal is a terminal connecting switching element 101 and current detection circuit 150 with resistor 13, and is a terminal for detecting the current flowing through switching element 101.

The GND terminal is a terminal connecting GND that is a reference potential of switching control circuit 100 to the low-potential side of an input terminal of the switching power supply device.

Start-up circuit 160 is connected to the DRAIN terminal, the VCC terminal, smoothing capacitor 102, and circuit internal voltage source VDD of switching control circuit 100. When the switching power supply device starts up, the following is performed. That is, when an input DC voltage Vin is applied to the DRAIN terminal via primary winding 4a of transformer 4, the start-up current flows to smoothing capacitors 102 and 15 from the DRAIN terminal via start-up circuit 160. Smoothing capacitors 102 and 15 are charged, and the VDD voltage and the VCC terminal voltage each rise to reach the start-up voltage. Then, start-up circuit 160 cuts the start-up current. Further, start-up circuit 160 monitors the VCC terminal voltage in order to determine whether the switching operation of switching element 101 is possible or not. In addition, although not shown, start-up circuit 160 outputs start-up and stop signals to pulse control circuit 140.

Pulse control circuit 140 is a circuit for controlling the switching operation of switching element 101. Pulse control circuit 140 determines the switching operation, the stopping, the turn-on timing, and the turn-off timing on the basis of signals and the like input from current detection circuit 150 and intermittent oscillation control circuit 170. Note that pulse control circuit 140 includes a turn-on signal generation circuit such as an oscillator that generates a periodic clock signal for the turn-on timing, a drive circuit for driving switching element 101, and the like. The clock signal of the oscillator is set to a frequency of 25 kHz, for example.

Current detection circuit 150 detects the current flowing through switching element 101. Therefore, the voltage signal generated on resistor 13 connected to the IS terminal is input to current detection circuit 150. Current detection circuit 150 compares the voltage signal with a preset reference voltage, and outputs a turn-off signal for turning off switching element 101 to pulse control circuit 140. Note that the reference voltage for comparison may be changed in accordance with the control signal VEAO from feedback control circuit 110 depending on the type of the switching control. For example, when the PWM control of the current mode is performed during the normal operation, the reference voltage is raised as the load becomes heavier in accordance with the control signal VEAO. Further, the peak value of the current flowing through switching element 101 may be fixed by causing the reference voltage during the intermittent oscillation control to be constant.

A feedback signal output from output state detection circuit 7 is input to feedback control circuit 110 via the FB terminal. Feedback control circuit 110 generates the control signal VEAO for controlling the switching operation of switching element 101. For example, when the PWM control of the current mode is performed during the normal operation, the current flowing through switching element 101 is controlled. Therefore, the control signal VEAO is output to current detection circuit 150. Further, intermittent oscillation control is performed in accordance with the load, and hence the control signal VEAO is also output to intermittent oscillation control circuit 170.

Figure 2:
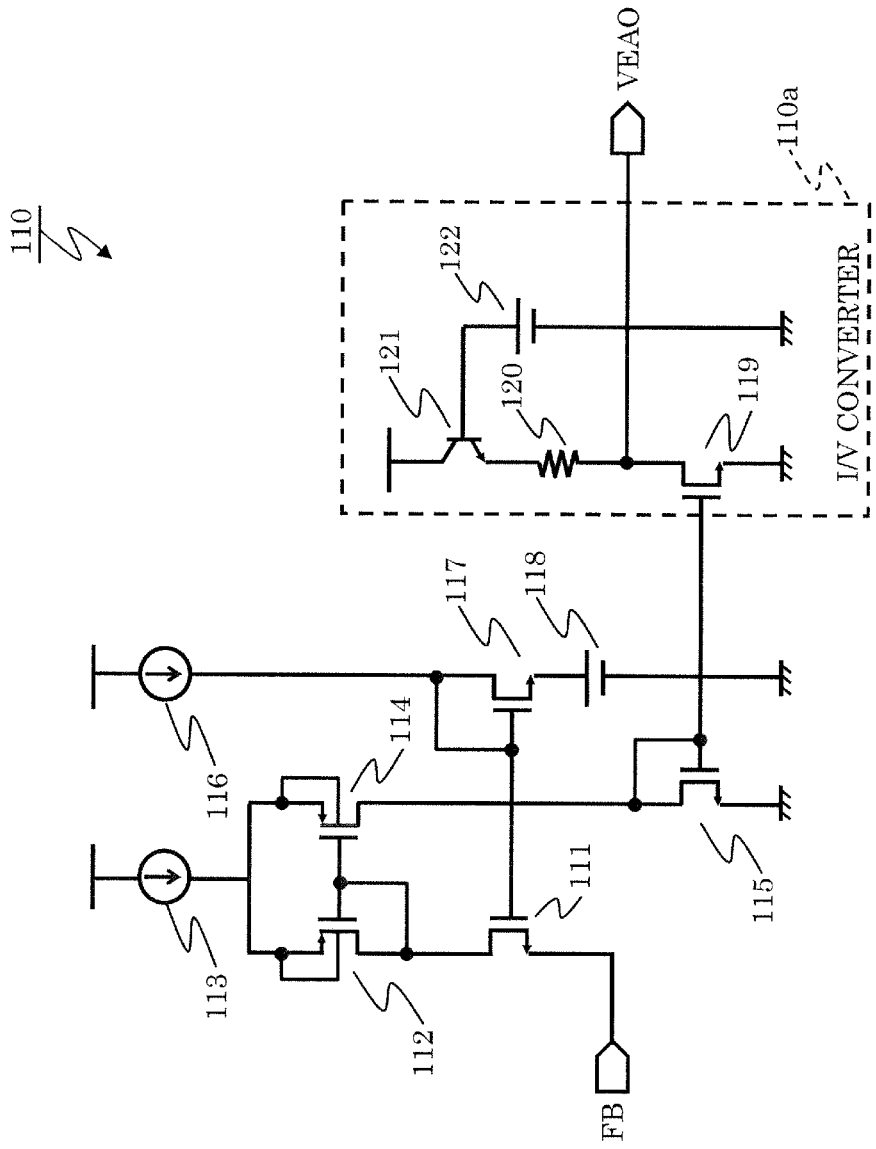
FIG. 2 is a circuit diagram illustrating a configuration of a feedback control circuit according to Embodiment 1.

FIG. 2 is a circuit diagram illustrating a configuration of feedback control circuit 110 of Embodiment 1. Feedback control circuit 110 is formed by constant current sources 113 and 116, P-type MOSFETs 112 and 114, N-type MOSFETs 111, 115, 117, and 119, reference voltage sources 118 and 122, resistor 120, and NPN bipolar transistor 121. N-type MOSFET 119, resistor 120, NPN bipolar transistor 121, and reference voltage source 122 form I/V converter 110a, which converts current that is proportional to the FB terminal current to a voltage signal, and generates the control signal VEAO. As the current flowing from the FB terminal increases, the control signal VEAO decreases. Accordingly, the peak value of the current flowing through switching element 101 is controlled to be low.

Intermittent oscillation control circuit 170 outputs the intermittent oscillation control signal Enable for performing intermittent oscillation control to pulse control circuit 140 in accordance with the control signal VEAO input from feedback control circuit 110. Pulse control circuit 140 controls the switching operation of switching element 101 by setting the time period in which the intermittent oscillation control signal Enable is at a high level to be the intermittent oscillation time period. Further, pulse control circuit 140 performs the intermittent oscillation control by stopping the switching operation of switching element 101 by setting the time period in which the intermittent oscillation control signal Enable is at a low level to be the intermittent stop time period.

Figure 3:
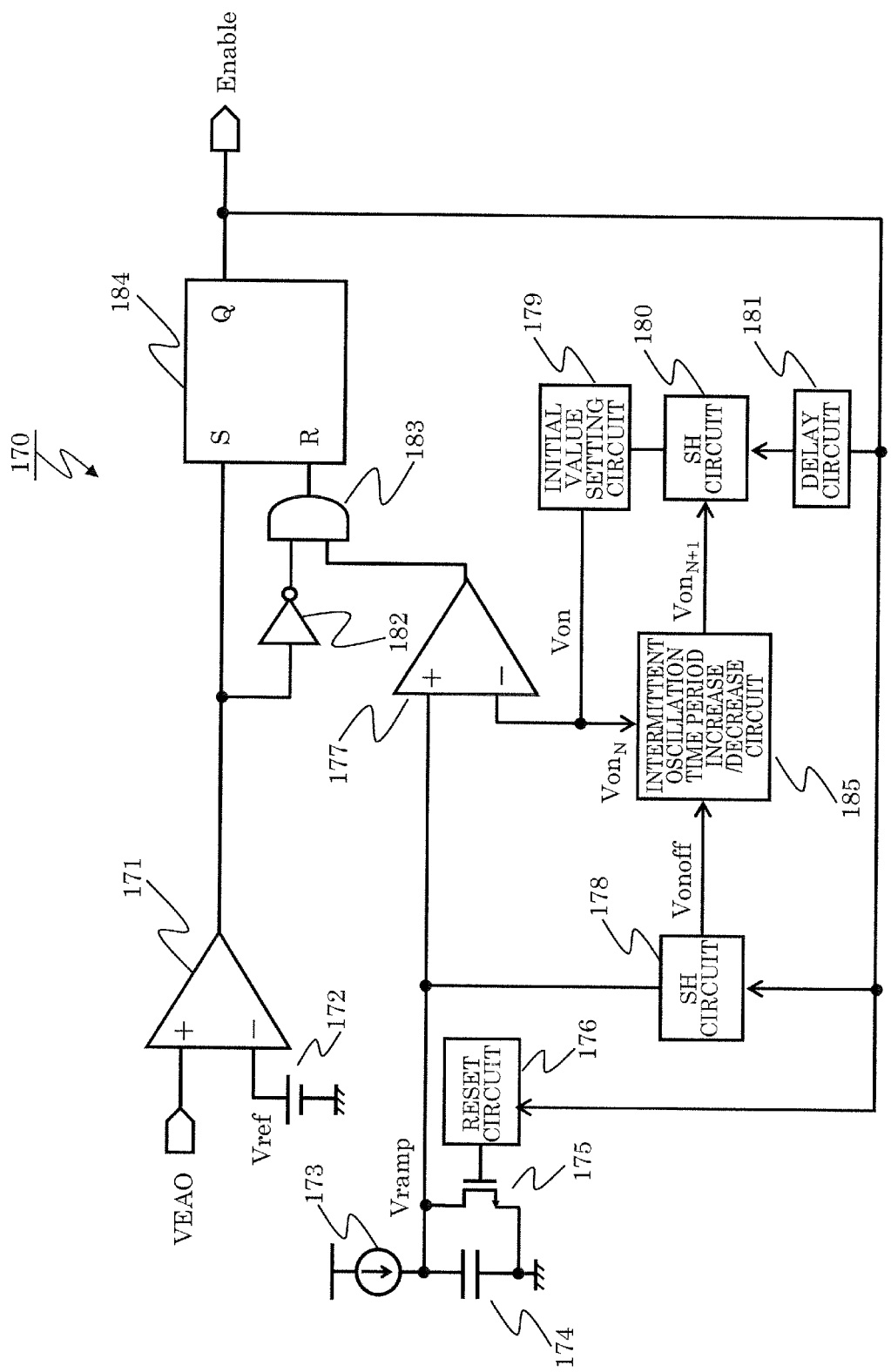
FIG. 3 is a circuit diagram illustrating a configuration of an intermittent oscillation control circuit according to Embodiment 1.

FIG. 3 a circuit diagram illustrating a configuration example of intermittent oscillation control circuit 170 of Embodiment 1. Intermittent oscillation control circuit 170 is formed by comparators 171 and 177, reference voltage source 172, constant current source 173, capacitor 174, N-type MOSFET 175, reset circuit 176, SH (SH is an abbreviation for "sample and hold") circuits 178 and 180, initial value setting circuit 179, delay circuit 181, inverter circuit 182, AND circuit 183, RS flip-flop circuit 184, and intermittent oscillation time period increase/decrease circuit 185. The control signal VEAO is compared with the reference voltage Vref across reference voltage source 172. When the control signal VEAO becomes higher than the reference voltage Vref, a high level is input to a set (S) input terminal of RS flip-flop circuit 184. As a result, the intermittent oscillation control signal Enable becomes high level, and the switching operation of switching element 101 becomes possible. Meanwhile, an output terminal of AND circuit 183 is connected to a reset (R) input terminal of RS flip-flop circuit 184. A signal obtained by inverting the output of comparator 171 by inverter circuit 182 and an output signal of comparator 177 are input to AND circuit 183. Comparator 177 compares a lamp voltage Vramp and an intermittent oscillation time period setting voltage Von with each other. When the output of comparator 171 is already inverted to a low level, comparator 177 determines the termination timing of the intermittent oscillation time period Ton. When the lamp voltage Vramp becomes higher than the intermittent oscillation time period setting voltage Von and the termination timing of the intermittent oscillation time period Ton is reached, the following is performed. That is, a high-level signal is input to a reset (R) terminal of RS flip-flop circuit 184, and the intermittent oscillation control signal Enable becomes low-level. As a result, the switching operation of switching element 101 stops. Then, when the control signal VEAO becomes higher than the reference voltage Vref again, the intermittent oscillation control signal Enable becomes high level. As a result, the intermittent stop time period Toff terminates, and the switching operation of switching element 101 starts again. As described above, a cycle including the intermittent oscillation time period Ton and the intermittent stop time period Toff is repeated, and the intermittent oscillation control is performed. Note that the lamp voltage Vramp is generated by charging capacitor 174 by the constant current from constant current source 173. In addition, the lamp voltage Vramp is used to monitor elapsed time from the start of the intermittent oscillation time period Ton in each cycle of the intermittent oscillation period. Further, in each cycle of the intermittent oscillation period, a previous intermittent oscillation time period setting voltage $Von_N$, and an intermittent oscillation period signal Vonoff output from SH circuit 178 are input to intermittent oscillation time period increase/decrease circuit 185, and the intermittent oscillation time period setting voltage Von is set via SH circuit 180 and initial value setting circuit 179.

Figure 4:
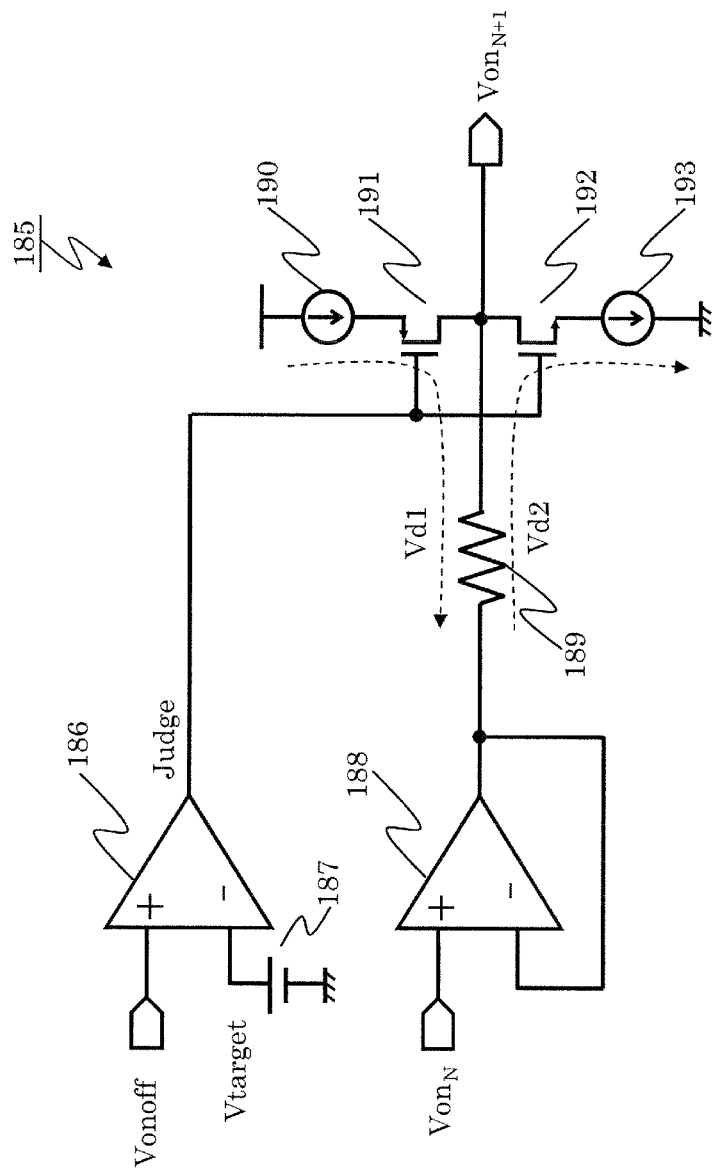
FIG. 4 is a circuit diagram illustrating a configuration of an intermittent oscillation time period increase/decrease circuit according to Embodiment 1.

FIG. 4 is a circuit diagram illustrating a configuration example of intermittent oscillation time period increase/decrease circuit 185 of Embodiment 1. Intermittent oscillation time period increase/decrease circuit 185 is formed by comparator 186, reference voltage source 187, operational amplifier 188, resistor 189, constant current sources 190 and 193, P-type MOSFET 191, and N-type MOSFET 192. The intermittent oscillation period signal Vonoff input from SH circuit 178 is compared with an intermittent oscillation period target voltage Vtarget from reference voltage source 187. Then, the direction of the constant current flowing through resistor 189 is switched. An intermittent oscillation time period setting voltage $Von_{N+1}$ of the current cycle is generated as follows. That is, the intermittent oscillation time period setting voltage $Von_N$ of the previous cycle maintained by SH circuit 180 is input, and the impedance conversion is performed by operational amplifier 188. Then, the product (also referred to as a first voltage drop value Vd1) of a constant current value from constant current source 190 and a resistor value of resistor 189 is added or the product (also referred to as a second voltage drop value Vd2) of a constant current value from constant current source 193 and a resistor value of resistor 189 is subtracted.

In other words, comparator 186 compares the intermittent oscillation period Tonoff with a preset target period (time defined by Vtarget). The intermittent oscillation period Tonoff is the sum of the intermittent oscillation time period Ton and the intermittent stop time period Toff. As the result of comparison, when the intermittent oscillation period Tonoff is shorter than the target period (time defined by Vtarget), the following is performed. That is, intermittent oscillation time period increase/decrease circuit 185 sets the intermittent oscillation time period (time defined by $Von_{N+1}$) of the current cycle to a length obtained by extending the oscillation time period (time defined by $Von_N$) of the previous cycle by a first predetermined time (that is, time corresponding to the first voltage drop value Vd1). In that case, for example, $Von_{N+1}$ is a voltage obtained by adding the first voltage drop value Vd1 to $Von_N$.

Meanwhile, as the result of comparison, when the intermittent oscillation period Tonoff is longer than the target period (time defined by Vtarget), the following is performed. That is, intermittent oscillation time period increase/decrease circuit 185 sets the oscillation time period (time defined by $Von_{N+1}$) of the current cycle to a length obtained by subtracting the second predetermined time (that is, time corresponding to the second voltage drop value Vd2) from the oscillation time period (time defined by $Von_N$) of the previous cycle. In that case, $Von_{N+1}$ is a voltage obtained by subtracting the second voltage drop value Vd2 from $Von_N$, for example.

Further, output state detection circuit 7 is formed by a detection resistor, a Zener diode, a shunt regulator, and the like. Output state detection circuit 7 detects the voltage level of the output voltage Vout. Then, output state detection circuit 7 outputs a feedback signal to switching control circuit 100 via photocoupler 8 so that the output voltage Vout is stabilized as a predetermined voltage. Note that, in the detection of the output voltage Vout, the flyback voltage generated by auxiliary winding 4c may be used. Further, a VCC voltage obtained after rectifying and smoothing is performed by rectifier diode 14 and smoothing capacitor 15 may be used.

The operation of the switching power supply device and the semiconductor device for switching control illustrated in FIG. 1 formed as above is described.

The AC voltage of a commercial power supply and the like is rectified and smoothed by a bridge diode, a smoothing capacitor, and the like, and the input DC voltage Vin is generated. The input DC voltage Vin is applied to the DRAIN terminal of switching control circuit 100 via primary winding 4a of transformer 4. Further, the start-up current flows to smoothing capacitor 15 connected to the VCC terminal from the DRAIN terminal via start-up circuit 160. When the VCC terminal voltage rises and reaches the start-up voltage set by start-up circuit 160, the switching control of switching element 101 starts.

Once switching element 101 is turned on, current flows through switching element 101 and resistor 13, and a voltage signal in accordance with the magnitude of the current is input to current detection circuit 150. Switching element 101 turns off when the voltage rises to a voltage that is equal to or more than the preset reference voltage.

When switching element 101 is turned off, the energy accumulated during the ON time of switching element 101 by the current flowing through the primary side of transformer 4 is transmitted to the secondary side.

The output voltage Vout rises by repeating the switching operation as above. When the output voltage Vout becomes a voltage that is equal to or more than a predetermined voltage set by output state detection circuit 7, output state detection circuit 7, and photocoupler 8 control current to flow out from the FB terminal of switching control circuit 100 as the feedback signal. Feedback control circuit 110 adjusts the current flowing through switching element 101 or the number of times of the switching per certain time period in accordance with the magnitude of the current that is flowing out.

Specifically, during heavy load in which the current supplied to the load connected to the switching power supply device is high, the current flowing through switching element 101 is set to be high. During light load, the current flowing through switching element 101 is set to be low. When the load becomes even lighter, the number of times of the switching is reduced by performing the intermittent oscillation control. As described above, switching control circuit 100 controls the output voltage Vout to be stabilized as a predetermined voltage while changing the switching operation of switching element 101 in accordance with the power supplied to the load connected to the switching power supply device.

Now, the operation of intermittent oscillation control circuit 170 is described. When the load becomes lighter and the FB terminal current increases, the control signal VEAO becomes lower than the reference voltage Vref across reference voltage source 172. Further, the output of comparator 171 becomes low level. A high level is input to AND circuit 183 from inverter circuit 182. Meanwhile, if the oscillation time period until that time is sufficiently long, the lamp voltage Vramp generated by constant current source 173 and capacitor 174 has sufficiently risen and is higher than the intermittent oscillation time period setting voltage Von. Therefore, the output of comparator 177 is high level. As a result, a high level is input to the reset (R) terminal of RS flip-flop circuit 184 from AND circuit 183, and the intermittent oscillation control signal Enable becomes low level. As a result, the switching operation of switching element 101 stops, and the intermittent oscillation time period Ton terminates.

When the switching operation stops, the output voltage Vout decreases, and the FB terminal current decreases. When the control signal VEAO becomes higher than the reference voltage Vref, the output of comparator 171 is inverted to a high level. Further, the output is input to the set (S) terminal of RS flip-flop circuit 184, and the intermittent oscillation control signal Enable is inverted to a high level. When the intermittent oscillation control signal Enable becomes high level, the switching operation of switching element 101 starts again. Simultaneously, the operation of SH circuit 178, reset circuit 176, and delay circuit 181 is triggered. First, SH circuit 178 samples the lamp voltage Vramp and stores the lamp voltage Vramp therein as the intermittent oscillation period signal Vonoff. Then, SH circuit 178 outputs the intermittent oscillation period signal Vonoff to intermittent oscillation time period increase/decrease circuit 185. Further, the voltage $Von_N$ corresponding to the intermittent oscillation time period $Ton_N$ of the previous cycle is input to intermittent oscillation time period increase/decrease circuit 185 from initial value setting circuit 179. Intermittent oscillation time period increase/decrease circuit 185 generates the voltage $Von_{N+1}$ corresponding to the intermittent oscillation time period $Ton_{N+1}$ of the current cycle, and outputs the voltage $Von_{N+1}$ to SH circuit 180.

Meanwhile, delay circuit 181 provides a delay time after inverting the intermittent oscillation control signal Enable to a high level, and operates SH circuit 180. The delay time only needs to be time necessary for SH circuit 178 to operate and the output of intermittent oscillation time period increase/decrease circuit 185 to be stabilized after the intermittent oscillation control signal Enable is inverted to a high level. For example, the delay time is set to about 1 μs. SH circuit 180 samples the output of intermittent oscillation time period increase/decrease circuit 185, and outputs the output to initial value setting circuit 179. Initial value setting circuit 179 sets an initial value when there is no output from SH circuit 180 when the switching power supply device is starting up or the like. When the output from intermittent oscillation time period increase/decrease circuit 185 of the previous cycle is stored in SH circuit 180, the output from SH circuit 180 is directly output to the reference side (−) of comparator 177 as the intermittent oscillation time period setting voltage Von. Note that the initial value set by initial value setting circuit 179 may be a preset fixed value. Alternatively, the initial value may be set on the basis of an intermittent oscillation time period $Ton_0$ of the first cycle after the start-up of the switching power supply device.

Now, the lamp voltage Vramp input to a detection side (+) of comparator 177 is described. The lamp voltage Vramp is generated when capacitor 174 is charged by the constant current from constant current source 173. The lamp voltage Vramp is controlled by reset circuit 176.

When the intermittent oscillation control signal Enable becomes high level, reset circuit 176 causes current to be carried by N-type MOSFET 175, discharges the electric charge stored in capacitor 174, and resets the lamp voltage Vramp. Note that, considering the time it takes for SH circuit 178 to sample and store therein the lamp voltage Vramp, a delay time until current is carried by N-type MOSFET 175 after the intermittent oscillation control signal Enable becomes high level may be provided. However, the delay time needs to be sufficiently shorter than the intermittent oscillation time period Ton.

When the resetting of the lamp voltage Vramp terminates, N-type MOSFET 175 is caused to not carry current, and the lamp voltage Vramp starts to rise again. That is, the lamp voltage Vramp is in proportion to the elapsed time from the start of each cycle of the intermittent oscillation control. Thus, the lamp voltage Vramp can be used as a monitor signal for the intermittent oscillation time period Ton and the intermittent oscillation period Tonoff.

The lamp voltage Vramp used as a monitor signal for the intermittent oscillation time period Ton is compared with the abovementioned intermittent oscillation time period setting voltage Von by comparator 177. When the lamp voltage Vramp becomes higher than the intermittent oscillation time period setting voltage Von, the output of comparator 177 is inverted to a high level and input to AND circuit 183. When the control signal VEAO becomes lower than the reference voltage Vref and the output of inverter circuit 182 is high level, the following is performed. That is, the output of AND circuit 183 is inverted to a high level, RS flip-flop circuit 184 is reset, the intermittent oscillation control signal Enable is inverted to a low level, and the intermittent oscillation time period Ton terminates. Therefore, in each cycle of the intermittent oscillation control, by controlling the intermittent oscillation time period setting voltage Von, the intermittent oscillation time period changes and the intermittent oscillation period Tonoff and the intermittent oscillation frequency are adjusted.

The intermittent oscillation time period setting voltage Von is controlled by determining the voltage value by intermittent oscillation time period increase/decrease circuit 185, and adjusting the timing at which the voltage value is changed and stored by delay circuit 181 and SH circuit 180. Note that the initial value is set by initial value setting circuit 179.

Intermittent oscillation time period increase/decrease circuit 185 compares the intermittent oscillation period signal Vonoff of the previous cycle and the intermittent oscillation period target voltage Vtarget with each other, and generates a period judgement signal Judge. The intermittent oscillation period target voltage Vtarget is set by taking the rising rate of the lamp voltage Vramp into consideration. For example, the intermittent oscillation period target voltage Vtarget is set to a voltage corresponding to an intermittent oscillation period target value 1 ms (intermittent oscillation frequency target value 1 kHz).

When an intermittent oscillation period $Tonoff_N$ of the previous cycle is shorter than the intermittent oscillation period target value, the period judgement signal Judge becomes low level. Further, P-type MOSFET 191 carries current, and the constant current from constant current source 190 flows through resistor 189 and operational amplifier 188. As a result, the intermittent oscillation time period setting voltage $Von_{N+1}$ of the current cycle becomes a voltage value obtained by adding the product (first voltage drop value Vd1) of the constant current value from constant current source 190 and the resistor value of resistor 189 to the intermittent oscillation time period setting voltage $Von_N$ of the previous cycle. That is, the oscillation time period (Ton defined by $Von_{N+1}$) of the current cycle becomes a length obtained by extending the oscillation time period (Ton defined by $Von_N$) of the previous cycle by the first predetermined time (the time corresponding to the first voltage drop value Vd1). Note that the product (that is, the first voltage drop value Vd1) of the constant current value from constant current source 190 and the resistor value of resistor 189 may be a voltage value corresponding to one period of the switching operation period of switching element 101. When the switching frequency of switching element 101 is 25 kHz, for example, the product may be set to a voltage value corresponding to a range of from 20 us to 80 us so as to be in a range of from ½ times to two times the switching operation period.

Meanwhile, when the intermittent oscillation period $Tonoff_N$ of the previous cycle is longer than the intermittent oscillation period target value, the period judgement signal Judge becomes high level. Further, N-type MOSFET 192 carries current, and the constant current from constant current source 193 flows through resistor 189 and operational amplifier 188. As a result, the intermittent oscillation time period setting voltage $Von_{N+1}$ of the current cycle becomes a voltage value obtained by subtracting the product (that is, the second voltage drop value Vd2) of the constant current value from constant current source 190 and the resistor value of resistor 189 from the intermittent oscillation time period setting voltage $Von_N$ of the previous cycle. That is, the oscillation time period (Ton defined by $Von_{N+1}$) of the current cycle becomes a length obtained by subtracting the second predetermined time (the time corresponding to the second voltage drop value Vd2) from the oscillation time period (Ton defined by $Von_N$) of the previous cycle.

From the above, the following control is obtained. In the control, the intermittent oscillation time period $Ton_{N+1}$ of the current cycle is set to a time period obtained by extending or shortening the intermittent oscillation time period $Ton_N$ of the previous cycle by a predetermined time, for example, one period of the switching operation period of switching element 101. As a result, the intermittent oscillation period Tonoff becomes closer to the intermittent oscillation period target value. By repeating the intermittent oscillation control cycle until the intermittent oscillation period Tonoff reaches the intermittent oscillation period target value, the intermittent oscillation frequency can be controlled to be a desired frequency.

Note that the first predetermined time may be time within a range of from ½ times to two times the switching operation period of switching element 101. Further, the second predetermined time may be time within a range of from ½ times to two times the switching operation period of switching element 101.

Figure 5:
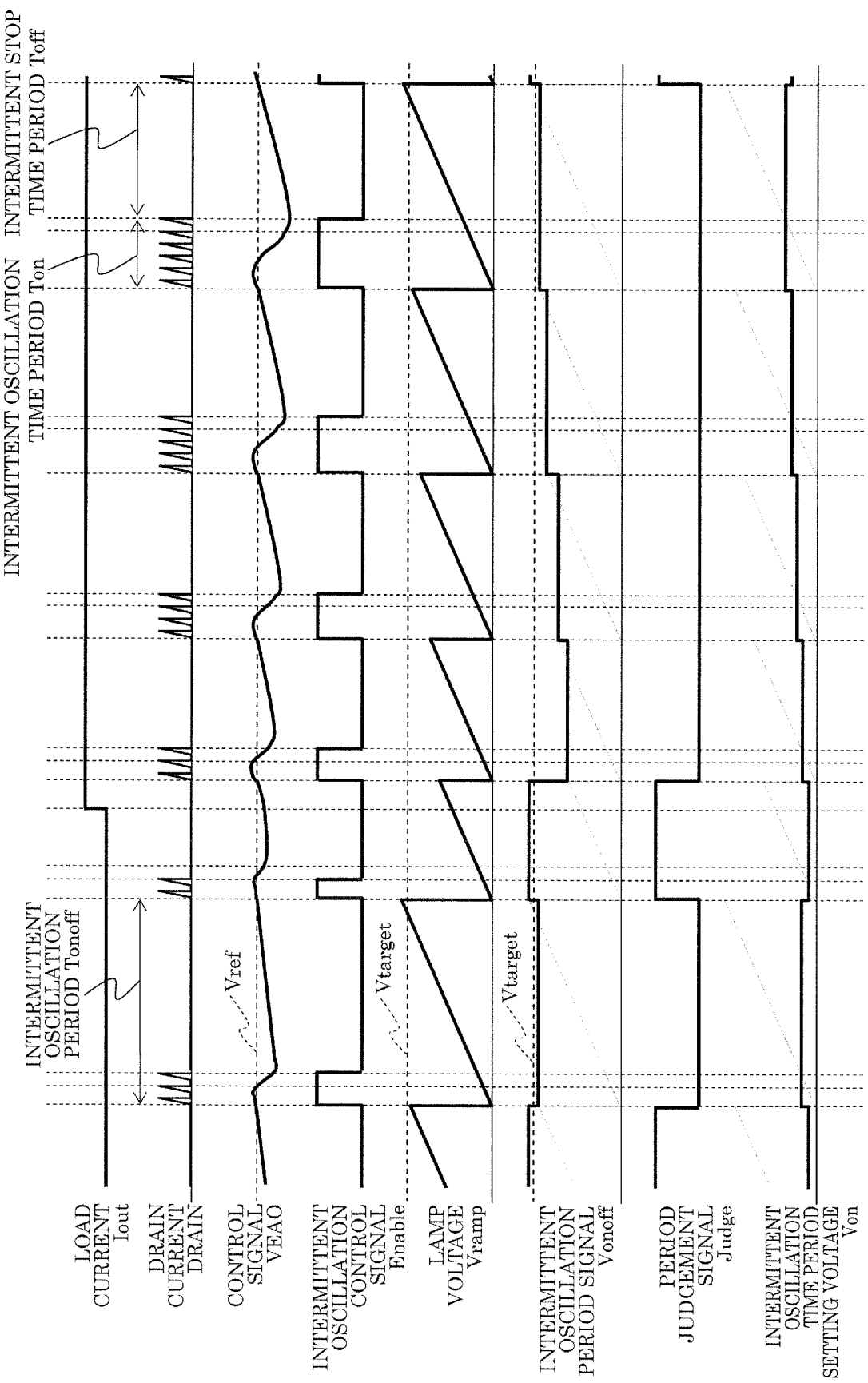
FIG. 5 is a timing chart illustrating an operation example of intermittent oscillation control in the switching power supply device according to Embodiment 1.

Next, with reference to the timing chart illustrated in FIG. 5, an operation example of the intermittent oscillation control of the switching power supply device in Embodiment 1 is described. FIG. 5 illustrates a load current Iout supplied from the switching power supply device, the drain current flowing through switching element 101, the control signal VEAO, the intermittent oscillation control signal Enable, the lamp voltage Vramp, the intermittent oscillation period signal Vonoff, the period judgement signal Judge, and the intermittent oscillation time period setting voltage Von. Further, FIG. 5 is an operation example of the intermittent oscillation control when the load current Iout supplied from the switching power supply device changes.

In the time period in which the load current Iout is low, the intermittent oscillation time period Ton is controlled so that the intermittent oscillation period Tonoff is the intermittent oscillation period target value. Further, the number of times switching element 101 switches is stabilized to be two times or three times. Note that the energy supplied by the switching operation of switching element 101 becomes discrete in accordance with the number of times of the switching. Therefore, when the intermittent oscillation period Tonoff does not match with the intermittent oscillation period target value, the number is considered to be stabilized even when the intermittent oscillation time period Ton changes. For example, the number is considered to be stabilized even when the number of times of the switching alternates between two times or three times.

When the load current Iout becomes high, the intermittent oscillation period Tonoff becomes shorter with respect to the intermittent oscillation period target value when the number of times of the switching is two times or three times. Further, the period judgement signal Judge is maintained at low level. Therefore, intermittent oscillation time period increase/decrease circuit 185 continues to increase the intermittent oscillation time period setting voltage Von by an amount preset by the constant current value from constant current source 190 and the resistor value of resistor 189. As a result, the intermittent oscillation time period Ton gradually extends. Accordingly, the number of times switching element 101 switches during the intermittent oscillation time period Ton also increases to three times, four times, and five times. The intermittent oscillation period Tonoff finally reaches the intermittent oscillation period target value in the cycle in which the number of times becomes six times. Then, the number of times switching element 101 switches during the intermittent oscillation time period Ton is stabilized at five times or six times.

As described above, even when the load current Tout changes, the intermittent oscillation time period Ton is controlled so that the intermittent oscillation period Tonoff is the intermittent oscillation period target value. Further, the intermittent oscillation time period Ton is adjusted by repeating the increase or the decrease of an amount preset by the constant current value from constant current source 190 and the resistor value of resistor 189.

From the above, the switching power supply device of Embodiment 1 can adjust the intermittent oscillation period Tonoff in accordance with the load by controlling the intermittent oscillation time period Ton on the basis of a result obtained by comparing the intermittent oscillation period Tonoff with the intermittent oscillation period target value. By repeating the adjustment of the intermittent oscillation period Tonoff, the intermittent oscillation frequency can be caused to be closer to the intermittent oscillation frequency target value, and the audible noise can be suppressed by setting the intermittent oscillation frequency to 1 kHz, for example.

Further, also for the load fluctuation during the intermittent oscillation control, the change amount of the intermittent oscillation time period Ton is only the increase or the decrease of a preset amount. Therefore, a circuit for control stabilization does not need to be added. Further, intermittent oscillation time period increase/decrease circuit 185 for controlling the intermittent oscillation time period Ton is formed by only comparator 186 and a circuit that increases and decreases a preset amount, and can be realized by an extremely simple circuit.

Note that intermittent oscillation time period increase/decrease circuit 185 compares the intermittent oscillation period Tonoff and the intermittent oscillation period target value with each other, but may monitor the intermittent oscillation frequency and compare the intermittent oscillation frequency with the intermittent oscillation frequency target value. Further, the lamp voltage Vramp is used to monitor the intermittent oscillation period Tonoff, but the clock signal Clock may be counted with use of a counter circuit instead.

Further, the intermittent oscillation time period Ton may be extended or shortened in accordance with the change of the lamp voltage Vramp instead of the change of the intermittent oscillation time period setting voltage Von. For example, the intermittent oscillation time period Ton may be extended by delaying the timing at which the charging starts by extending the reset time by reset circuit 176. Further, the intermittent oscillation time period Ton may be shortened by increasing the lamp voltage Vramp when the charging starts by causing the reset by reset circuit 176 to be insufficient.

Further, the constant current values of constant current sources 190 and 193 of intermittent oscillation time period increase/decrease circuit 185 do not necessarily need to be the same.

Further, a capacitor externally attached to switching control circuit 100 may be used as capacitor 174 of intermittent oscillation control circuit 170.

Further, a predetermined amount by which the intermittent oscillation period target voltage Vtarget and the intermittent oscillation time period Ton are changed may be able to be adjusted by a circuit section externally attached to switching control circuit 100.

Further, various control forms such as PWM control in which the clock signal is a fixed frequency, PFM control in which the clock signal is a variable frequency, and quasi-resonant control and current resonant control using resonant operation, may be applied to pulse control circuit 140.

Further, output state detection circuit 7 and photocoupler 8 are provided to generate the feedback signal indicating the load state. However, the feedback signal may be generated by detection from auxiliary winding $4c$ or the VCC terminal voltage after the rectifying and smoothing instead of detection from the output voltage Vout on the secondary side.

Further, output state detection circuit 7 may perform constant current control in which a feedback signal that fixes the load current Tout is generated instead of constant voltage control in which a feedback signal that fixes the output voltage Vout on the secondary side is generated.

Further, the configuration of the flyback switching power supply device has been described, but a configuration with a different topology such as a forward type or step-down chopper type may be used.

Embodiment 2

Next, a switching power supply device and a semiconductor device according to Embodiment 2 are described with reference to FIG. 6 to FIG. 9.

In Embodiment 1, in each cycle of the intermittent oscillation control, the intermittent oscillation time period setting voltage Von is controlled on the basis of a result obtained by comparing the intermittent oscillation period signal Vonoff of the previous cycle and the intermittent oscillation period target voltage Vtarget with each other. In Embodiment 2, there is described a switching power supply device including intermittent oscillation control circuit 270 that extends or shortens the intermittent oscillation time period $Ton_N$ of the previous cycle by one period of the clock signal Clock generated by pulse control circuit 140. The extension or shortening is performed on the basis of a result obtained by comparing the intermittent oscillation period signal Vonoff of the previous cycle and the intermittent oscillation period target voltage Vtarget with each other. Note that description overlapping with Embodiment 1 is omitted.

Figure 6:
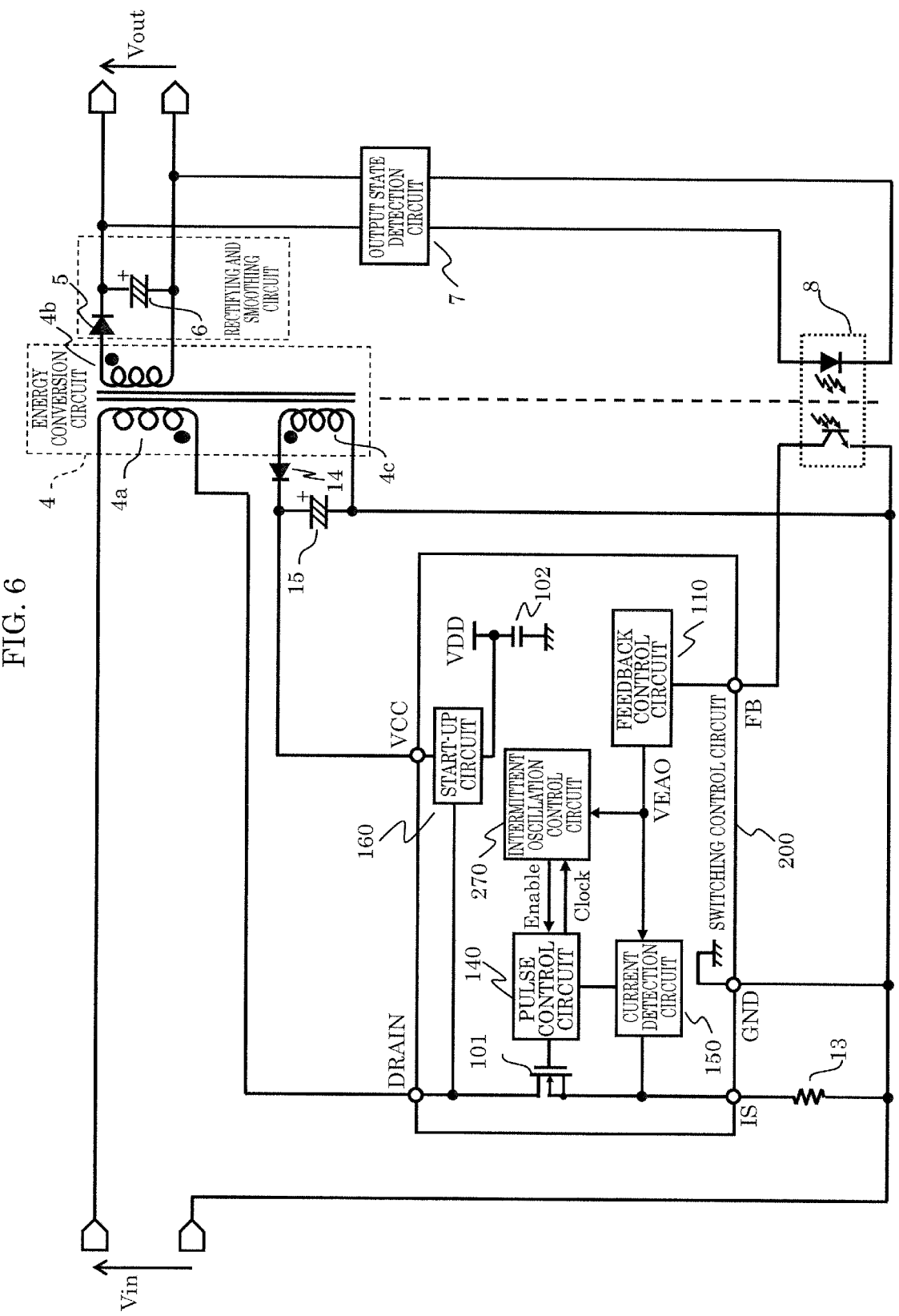
FIG. 6 is a circuit diagram illustrating a configuration example of a switching power supply device according to Embodiment 2.
Figure 7:
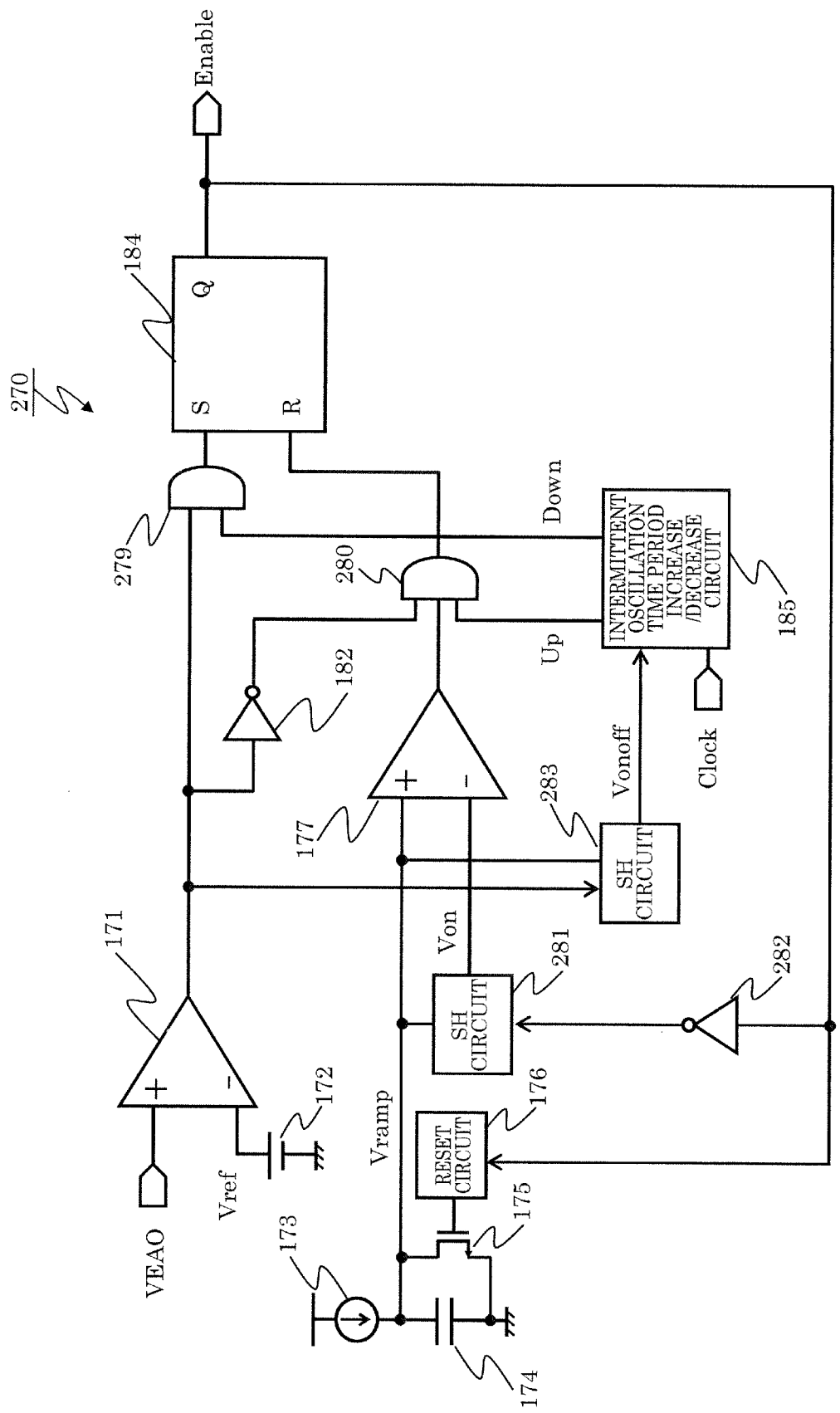
FIG. 7 is a circuit diagram illustrating a configuration of an intermittent oscillation control circuit according to Embodiment 2.
Figure 8:
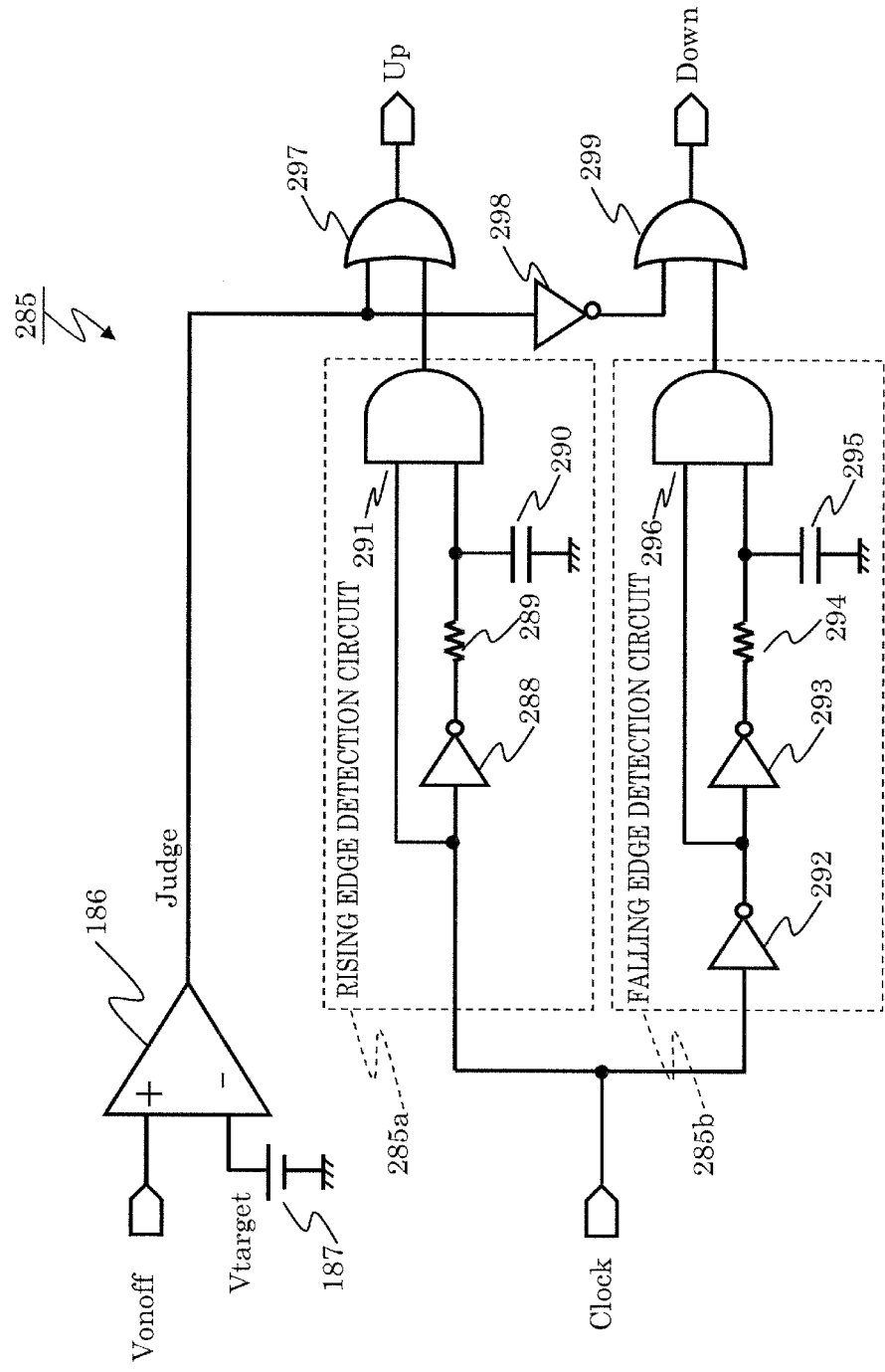
FIG. 8 is a circuit diagram illustrating a configuration of an intermittent oscillation time period increase/decrease circuit according to Embodiment 2.

FIG. 6 is a circuit diagram illustrating a configuration example of the switching power supply device of Embodiment 2. The switching power supply device of FIG. 6 is different from FIG. 1 illustrating the switching power supply device of Embodiment 1 in that the switching power supply device of FIG. 6 includes switching control circuit 200 in place of switching control circuit 100. The differences are mainly described below. Switching control circuit 200 is different from switching control circuit 100 in FIG. 1 in that switching control circuit 200 includes intermittent oscillation control circuit 270 in place of intermittent oscillation control circuit 170. Further, FIG. 7 is a circuit diagram illustrating a configuration example of intermittent oscillation control circuit 270 of the switching power supply device of Embodiment 2. FIG. 7 is different from FIG. 3 illustrating intermittent oscillation control circuit 170 of Embodiment 1 in the following points. SH circuit 178, initial value setting circuit 179, SH circuit 180, delay circuit 181, AND circuit 183, and intermittent oscillation time period increase/decrease circuit 185 are removed. The clock signal Clock is input from pulse control circuit 140. AND circuits 279 and 280, inverter circuit 282, SH (SH is an abbreviation for "sample and hold") circuits 281 and 283, and intermittent oscillation time period increase/decrease circuit 285 are added. Further, FIG. 8 is a circuit diagram illustrating a configuration example of intermittent oscillation time period increase/decrease circuit 285 of the switching power supply device of Embodiment 2. FIG. 8 is different from FIG. 4 illustrating intermittent oscillation time period increase/decrease circuit 185 of Embodiment 1 in the following points. Operational amplifier 188, resistor 189, constant current sources 190 and 193, P-type MOSFET 191, and N-type MOSFET 192 are removed. The clock signal Clock is input. Rising edge detection circuit 285a, falling edge detection circuit 285b, OR circuits 297 and 299, and inverter circuit 298 are added. Note that rising edge detection circuit 285a is formed by inverter circuit 288, resistor 289, capacitor 290, and AND circuit 291. Falling edge detection circuit 285b is formed by inverter circuits 292 and 293, resistor 294, capacitor 295, and AND circuit 296.

The operation of the switching power supply device and the semiconductor device according to Embodiment 2 formed as above is described by mainly focusing on the intermittent oscillation control different from Embodiment 1.

The intermittent oscillation control during light load controls the switching operation of switching element 101 by the intermittent oscillation control signal Enable that is an output from RS flip-flop circuit 184 as with Embodiment 1. Meanwhile, the intermittent oscillation time period Ton is controlled by changing the set or reset timing of RS flip-flop circuit 184 by an intermittent oscillation time period increase signal Up and an intermittent oscillation time period decrease signal Down that are output signals from intermittent oscillation time period increase/decrease circuit 285.

The intermittent oscillation time period setting voltage Von is set to a voltage $Von_N$ corresponding the intermittent oscillation time period $Ton_N$ of the previous cycle by inverter circuit 282 and SH circuit 281. Therefore, comparator 177 that compares the lamp voltage Vramp and the intermittent oscillation time period setting voltage Von with each other is inverted to a high level when time equivalent to the intermittent oscillation time period $Ton_N$ of the previous cycle elapses in each cycle of the intermittent oscillation control. When the output of inverter circuit 182 and an intermittent oscillation time period increase signal Up are high level, the following is performed. That is, RS flip-flop circuit 184 is reset via AND circuit 280 at a timing in which the output of comparator 177 is inverted to a high level, and the intermittent oscillation time period Ton terminates. When the intermittent oscillation time period increase signal Up is low level, the intermittent oscillation time period Ton is extended until the intermittent oscillation time period increase signal Up is inverted to a high level.

When the switching operation of switching element 101 stops, the output voltage Vout decreases and the FB terminal current decreases. When the control signal VEAO exceeds the reference voltage Vref, the output of comparator 171 is inverted to a high level. When the intermittent oscillation time period decrease signal Down is high level, the following is performed. At a timing in which the output of comparator 171 is inverted to a high level, RS flip-flop circuit 184 is set via AND circuit 279, and the intermittent oscillation time period Ton starts. When the intermittent oscillation time period decrease signal Down is low level, the start of the intermittent oscillation time period Ton is delayed until the intermittent oscillation time period decrease signal Down is inverted to a high level. That is, the intermittent oscillation time period $Ton_{N+1}$ of the current cycle is set to a time period obtained by shortening the intermittent oscillation time period $Ton_N$ of the previous cycle by a predetermined time.

As described above, the intermittent oscillation time period Ton is set to a time period obtained by extending the intermittent oscillation time period $Ton_N$ of the previous cycle by a predetermined time by the intermittent oscillation time period increase signal Up. Alternatively, the intermittent oscillation time period Ton is set to a time period obtained by shortening the intermittent oscillation time period $Ton_N$ of the previous cycle by a predetermined time by the intermittent oscillation time period decrease signal Down. As a result, the intermittent oscillation time period Ton is controlled.

The intermittent oscillation time period increase signal Up and the intermittent oscillation time period decrease signal Down are generated by intermittent oscillation time period increase/decrease circuit 285. The clock signal Clock from pulse control circuit 140 and the intermittent oscillation period signal Vonoff that is an output from SH circuit 283 are input to intermittent oscillation time period increase/decrease circuit 285. SH circuit 283 samples the lamp voltage Vramp, stores the lamp voltage Vramp therein, and generates the intermittent oscillation period signal Vonoff at a timing in which the output of comparator 171 is inverted to a high level.

Intermittent oscillation time period increase/decrease circuit 285 compares the intermittent oscillation period signal Vonoff corresponding to the intermittent oscillation period of the previous cycle and the intermittent oscillation period target voltage Vtarget with each other, and generates the period judgement signal Judge.

When the intermittent oscillation period $Tonoff_N$ of the previous cycle is shorter than the intermittent oscillation period target value, the period judgement signal Judge becomes low level, and the intermittent oscillation time period decrease signal Down is fixed at a high level. Further, the intermittent oscillation time period increase signal Up depends on the output from rising edge detection circuit 285a to which the clock signal Clock is input. The intermittent oscillation time period increase signal Up is a pulse signal that rises up at a timing in which the clock signal Clock is inverted to a high level from a low level. The intermittent oscillation time period increase signal Up has a width set by rising edge detection circuit 285a, and is synchronized with the clock signal Clock. Therefore, a high level of the intermittent oscillation time period increase signal Up is input to AND circuit 280 of intermittent oscillation control circuit 270 at the timing in which the pulse of the next clock signal Clock rises up after the output of comparator 177 becomes high-level. When the high level of the intermittent oscillation time period increase signal Up is input, RS flip-flop circuit 184 is reset and the intermittent oscillation control signal Enable is inverted to a low level.

That is, the intermittent oscillation time period $Ton_{N+1}$ of the current cycle terminates after the time of one switching operation of switching element 101 is added to the intermittent oscillation time period $Ton_N$ of the previous cycle.

Meanwhile, when the intermittent oscillation period $Tonoff_N$ of the previous cycle is longer than the intermittent oscillation period target value, the period judgement signal Judge becomes high level. In addition, the intermittent oscillation time period increase signal Up is fixed at a high level. Further, the intermittent oscillation time period decrease signal Down depends on the output of falling edge detection circuit 285*b* to which the clock signal Clock is input. The intermittent oscillation time period decrease signal Down is a pulse signal that rises up at a timing in which the clock signal Clock is inverted from a high level to a low level. The intermittent oscillation time period decrease signal Down has a width set by falling edge detection circuit 285*b*, and is synchronized with the clock signal Clock. Therefore, a high level of the intermittent oscillation time period decrease signal Down is input to AND circuit 279 of intermittent oscillation control circuit 270 at the timing in which the next clock signal Clock is inverted from a high level to a low level after the output of comparator 171 becomes high level. That is, RS flip-flop circuit 184 is set after the output of comparator 171 is inverted to a high level and the pulse signal of the next clock signal Clock falls. Therefore, the intermittent stop time period $Toff_N$ of the previous cycle is substantially extended. Further, the intermittent oscillation time period $Ton_{N+1}$ of the current cycle is set to a time period obtained by shortening the intermittent oscillation time period $Ton_N$ of the previous cycle by the time of one switching operation of switching element 101.

Figure 9:
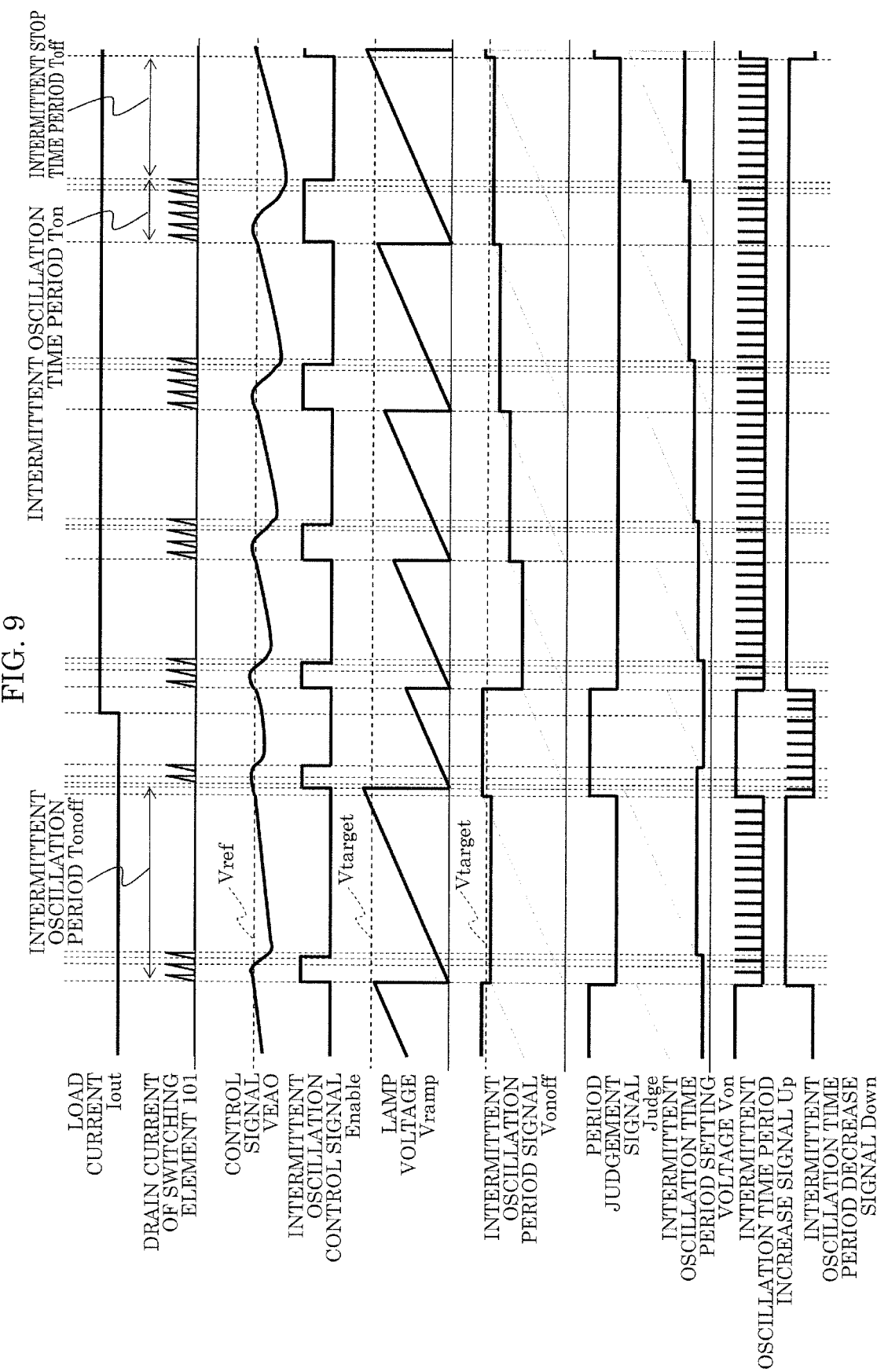
FIG. 9 is a timing chart illustrating an operation example of intermittent oscillation control in the switching power supply device according to Embodiment 2.

FIG. 9 is a timing chart illustrating an operation example of the intermittent oscillation control of the switching power supply device of Embodiment 2. When compared with FIG. 5 illustrating Embodiment 1, the intermittent oscillation time period increase signal Up and the intermittent oscillation time period decrease signal Down are added.

As with Embodiment 1, even when the load current Iout changes, the intermittent oscillation time period Ton is controlled so that the intermittent oscillation period Tonoff is the intermittent oscillation period target value. Further, the intermittent oscillation time period Ton is adjusted by repeating the increase or the decrease of a preset amount such as one period of the clock signal Clock of pulse control circuit 140, that is, one switching operation of switching element 101.

From the above, as with Embodiment 1, the switching power supply device of Embodiment 2 can adjust the intermittent oscillation period Tonoff in accordance with the load by controlling the intermittent oscillation time period Ton on the basis of a result obtained by comparing the intermittent oscillation period Tonoff with the intermittent oscillation period target value.

Further, also for the load fluctuation during the intermittent oscillation control, the change amount of the intermittent oscillation time period Ton is only the increase or the decrease of a preset amount, and a circuit for control stabilization does not need to be added. Further, intermittent oscillation time period increase/decrease circuit 285 that controls the intermittent oscillation time period Ton is formed by only comparator 186 and a circuit that changes the set or reset timing of RS flip-flop circuit 184, and can be realized by an extremely simple circuit.

Further, the preset amount for increasing or decreasing the intermittent oscillation time period Ton is set in accordance with the period of the clock signal Clock of pulse control circuit 140. Therefore, there is no need to consider the production tolerance and the like.

Note that the preset amount for increasing or decreasing the intermittent oscillation time period Ton uses one period of the clock signal Clock of pulse control circuit 140. However, a plurality of periods may be counted and used.

Further, the lamp voltage Vramp is used to monitor the intermittent oscillation period Tonoff, but the clock signal Clock may be counted with use of a counter circuit instead.

Embodiment 3

Next, a switching power supply device and a semiconductor device according to Embodiment 3 are described with reference to FIG. 10 and FIG. 11.

In Embodiment 1, the intermittent oscillation period target voltage Vtarget is set to a fixed value. However, in Embodiment 3, a switching power supply device in which the intermittent oscillation period target voltage Vtarget periodically changes is described. Note that description overlapping with Embodiment 1 is omitted.

Figure 10:
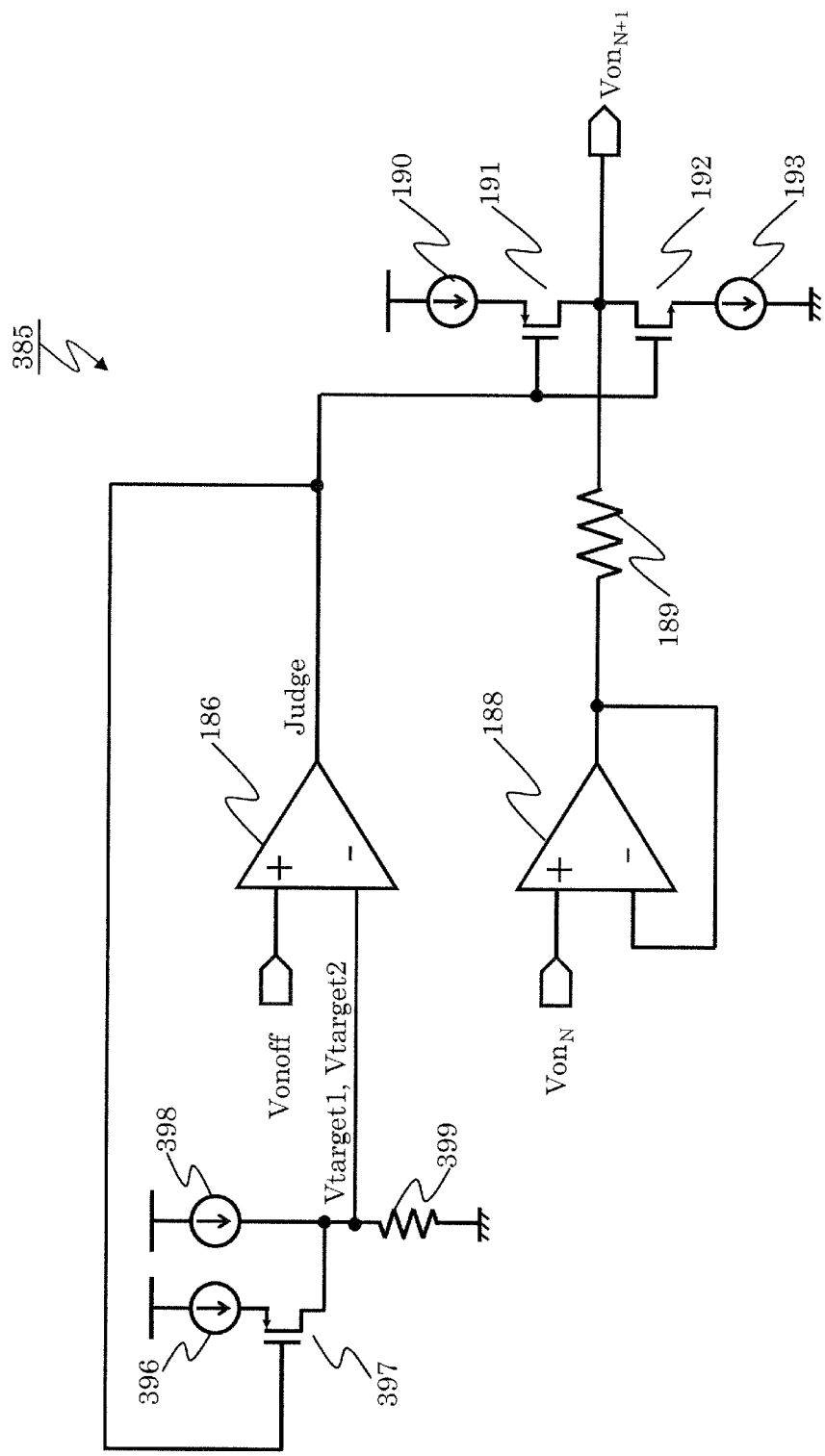
FIG. 10 is a circuit diagram illustrating a configuration of an intermittent oscillation time period increase/decrease circuit according to Embodiment 3.

FIG. 10 is a circuit diagram illustrating a configuration example of intermittent oscillation time period increase/decrease circuit 385 of the switching power supply device of Embodiment 3. Intermittent oscillation time period increase/decrease circuit 385 in FIG. 10 is different from FIG. 4 illustrating intermittent oscillation time period increase/decrease circuit 185 of Embodiment 1 in the following point. That is, intermittent oscillation time period increase/decrease circuit 385 includes constant current sources 396 and 398, P-type MOSFET 397, and resistor 399 in place of reference voltage source 187.

The operation of the switching power supply device and the semiconductor device according to Embodiment 3 formed as described above are described. The description mainly focuses on the increase or decrease control of the intermittent oscillation time period different from Embodiment 1.

The intermittent oscillation period target voltage Vtarget on the reference side (−) of comparator 186 is as follows. When the period judgement signal Judge is high level, the intermittent oscillation period target voltage Vtarget is set in accordance with the product of the constant current value of constant current source 398 and the resistor value of resistor 399. When the period judgement signal Judge is low level, P-type MOSFET 397 carries current, and the intermittent oscillation period target voltage Vtarget rises by the amount of the product of the constant current value of constant current source 396 and the resistor value of resistor 399. That is, the intermittent oscillation period target voltage Vtarget is periodically switched between a first intermittent oscillation period target voltage Vtarget1 and a second intermittent oscillation period target voltage Vtarget2. The second intermittent oscillation period target voltage Vtarget2 is high by the amount of the product of the constant current value of constant current source 396 and the resistor value of resistor 399. The switching is performed in accordance with the period judgement signal Judge.

Figure 11:
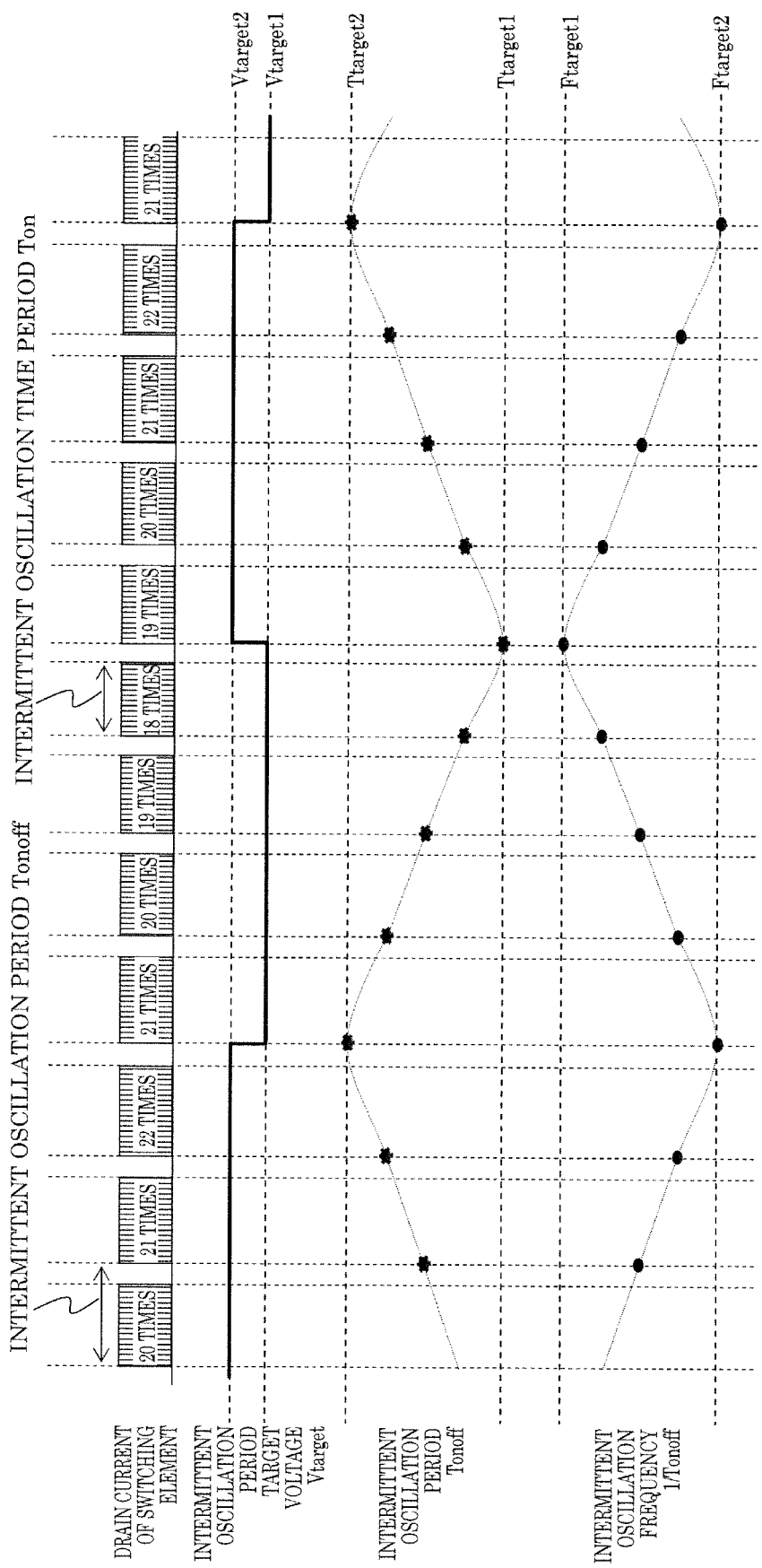
FIG. 11 is a timing chart illustrating an operation example of intermittent oscillation control in a switching power supply device according to Embodiment 3.

FIG. 11 is a timing chart illustrating an operation example of the intermittent oscillation control of the switching power supply device in Embodiment 3. FIG. 11 illustrates the drain current flowing through switching element 101, the intermittent oscillation period target voltage Vtarget, the intermittent oscillation period Tonoff, and the intermittent oscillation frequency. Note that, for the drain current flowing through switching element 101, the waveforms of the intermittent oscillation time period Ton are illustrated by rectangular blocks. For example, the block denoted by "20 times" indicates that 20 switching operations of switching element 101 are included in the intermittent oscillation time period Ton. Note that FIG. 11 is an operation example of the intermittent oscillation control when the load current Iout supplied from the switching power supply device is constant.

As with Embodiment 1, the intermittent oscillation time period Ton is controlled so that the intermittent oscillation period Tonoff becomes the intermittent oscillation period target value. However, in Embodiment 3, the intermittent oscillation period target voltage Vtarget periodically changes in accordance with the period judgement signal Judge. Therefore, even when the load current Tout is constant, the intermittent oscillation period Tonoff periodically changes within the range of from a first intermittent oscillation period target value Ttarget1 to a second intermittent oscillation period target value Ttarget2 in accordance with the change in the intermittent oscillation period target voltage Vtarget. The intermittent oscillation frequency that is a reciprocal of the intermittent oscillation period Tonoff also periodically changes within the range of from a second intermittent oscillation frequency target value Ftarget2 to a first intermittent oscillation frequency target value Ftarget1.

From the above, the switching power supply device of Embodiment 3 can obtain an effect equivalent to that of Embodiment 1. Further, the intermittent oscillation frequency can be dispersed by periodically modulating the intermittent oscillation period Tonoff. By the dispersion of the intermittent oscillation frequency, the energy concentration to a specific frequency is alleviated, and the effect of suppressing audible noise can be enhanced.

Note that, in order to increase the degree of dispersion of the intermittent oscillation frequency, the high level or the low level of the period judgement signal Judge is desired to be maintained for two cycles or more of the intermittent oscillation control. Further, setting is possible in accordance with the difference between the first intermittent oscillation period target voltage Vtarget1 and the second intermittent oscillation period target voltage Vtarget2.

Note that the intermittent oscillation period target voltage Vtarget is periodically switched in accordance with the period judgement signal Judge, but may be modulated regardless of the period judgement signal Judge. For example, constant current sources 396 and 398 and P-type MOSFET 397 of intermittent oscillation time period increase/decrease circuit 385 may be removed. The intermittent oscillation period target voltage Vtarget that periodically changes may be generated by causing periodically modulated current to flow through resistor 399 instead. In that case, the modulation period of current may be sufficiently long with respect to the intermittent oscillation period Tonoff.

Embodiment 4

Next, a switching power supply device and a semiconductor device according to Embodiment 4 are described with reference to FIG. 12 and FIG. 13.

In Embodiment 3, the intermittent oscillation frequency is dispersed by periodically changing the intermittent oscillation period target voltage Vtarget. However, in Embodiment 4, a switching power supply device that periodically modulates the peak value of the current flowing through switching element 101 is described. Note that descriptions overlapping with Embodiment 1 or Embodiment 3 are omitted.

Figure 12:
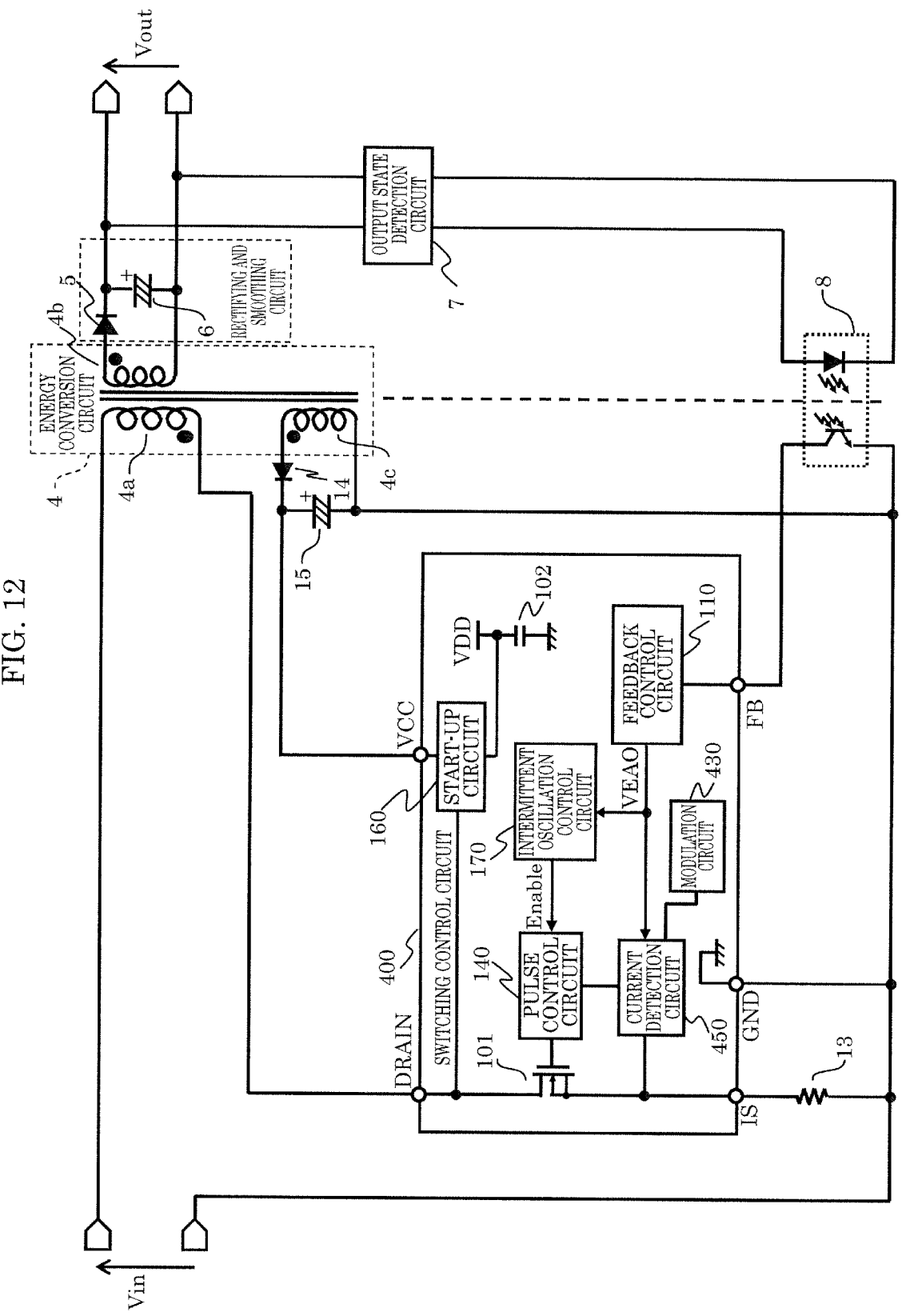
FIG. 12 is a circuit diagram illustrating a configuration example of a switching power supply device according to Embodiment 4.

FIG. 12 is a circuit diagram illustrating a configuration example of the switching power supply device of Embodiment 4. The switching power supply device of FIG. 12 is different from FIG. 1 illustrating the switching power supply device of Embodiment 1 in that switching power supply device of FIG. 12 includes switching control circuit 400 in place of switching control circuit 100. Switching control circuit 400 is different from switching control circuit 100 in FIG. 1 in that modulation circuit 430 is added and current detection circuit 450 is included in place of current detection circuit 150.

The operation of the switching power supply device and the semiconductor device according to Embodiment 4 formed as described above is described. The description mainly focuses on current detection circuit 450 and the increase or decrease control of the intermittent oscillation time period Ton different from Embodiment 1.

Current detection circuit 450 detects the current flowing through switching element 101. Therefore, the voltage signal generated on resistor 13 connected to the IS terminal is input to current detection circuit 450. Current detection circuit 450 compares the voltage signal with a preset reference voltage, and outputs a turn-off signal of switching element 101 to pulse control circuit 140. Note that the reference voltage for comparison may be changed in accordance with the control signal VEAO from feedback control circuit 110 depending on the type of the switching control. For example, during the normal operation, when the PWM control of the current mode is performed, the reference voltage is risen as the load becomes heavier in accordance with the control signal VEAO. Further, during the intermittent oscillation control, the peak value of the current flowing through switching element 101 may be fixed by causing the reference voltage to be constant. Here, modulation circuit 430 modulates the reference voltage during the intermittent oscillation control, for example. By periodically modulating the reference voltage, the peak value of the current flowing through switching element 101 is periodically modulated. Therefore, the energy supplied for one switching operation of switching element 101 is modulated, and the intermittent oscillation frequency also changes.

Figure 13:
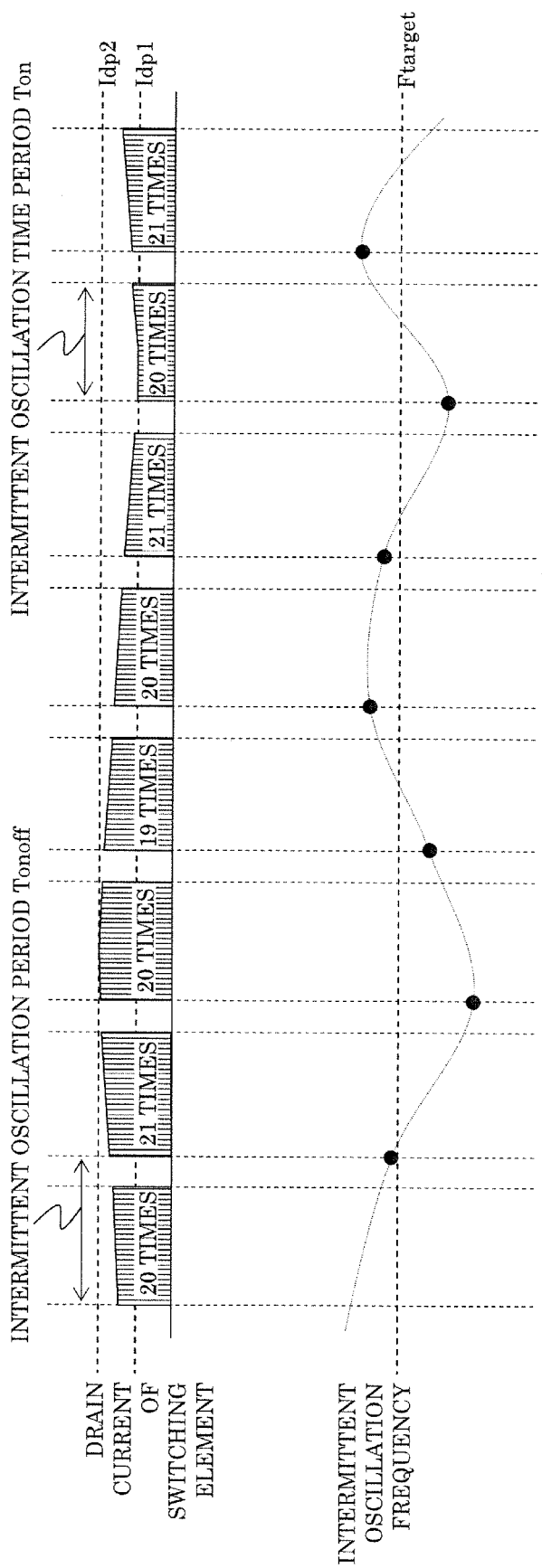
FIG. 13 is a timing chart illustrating an operation example of intermittent oscillation control in the switching power supply device according to Embodiment 4.

FIG. 13 is a timing chart illustrating an operation example of the intermittent oscillation control of the switching power supply device of Embodiment 4. FIG. 13 illustrates the drain current flowing through switching element 101 and the intermittent oscillation frequency. Note that, as with FIG. 11 illustrating Embodiment 3, for the drain current flowing through switching element 101, the waveforms of the intermittent oscillation time period Ton are illustrated by blocks. Further, FIG. 13 is an operation example of the intermittent oscillation control when the load current Iout supplied from the switching power supply device is constant.

As with Embodiment 1, the intermittent oscillation time period Ton is controlled so that the intermittent oscillation period Tonoff becomes the intermittent oscillation period target value. However, in Embodiment 4, the peak value of the current flowing through switching element 101 is periodically modulated. Therefore, the supplied energy changes even when the number of times of the switching included in the intermittent oscillation time period Ton is the same. For example, even when the number of times of the switching included in the intermittent oscillation time period Ton is the same 20 times, the supplied energy increases and the intermittent oscillation frequency decreases as the peak value of the current flowing through switching element 101 becomes higher.

Therefore, by periodically modulating the peak value of the current flowing through switching element 101, the discreteness of the supplied energy in each cycle of the intermittent oscillation control is improved as compared with Embodiment 1. Further, the intermittent oscillation frequency can be dispersed. By dispersing the intermittent oscillation frequency, the energy concentration to a specific frequency is alleviated, and the effect of suppressing audible noise can be enhanced.

Note that the discreteness of the supplied energy in each cycle of the intermittent oscillation control is improved. Therefore, a predetermined time for changing the intermittent oscillation time period Ton may be periodically modulated. Further, the turn-on timing or the turn-off timing of switching element 101 may be modulated. In addition, the intermittent oscillation period signal Vonoff or the intermittent oscillation time period setting voltage $Von_N$ of the previous cycle input to intermittent oscillation time period increase/decrease circuit 185 may be modulated, or the intermittent oscillation time period setting voltage $Von_{N+1}$ of the current cycle to be output may be modulated.

In order to exemplify the features disclosed in this application, the accompanying drawings and the detailed description have been provided above as embodiments.

Therefore, components illustrated and described in the accompanying drawings and the detailed description may include not only components that are essential to solve the problem, but also components that are not essential to solve the problem for the sake of exemplification of the above-mentioned features. Therefore, just because those unessential components are illustrated and described in the accompanying drawings and the detailed description, those unessential components should not be immediately considered to be essential.

Note that the features in the present disclosure are not limited to those described above, and can be applied to embodiments in which changes, replacement, addition, omission, and the like are made, as appropriate. Further, many modifications that would be conceived by those skilled in the art are possible and components in a plurality embodiments may be combined in the exemplary embodiments without materially departing from the novel teachings and advantages of the present disclosure. Accordingly, all such modifications and combinations are intended to be included within the scope of the present disclosure.

INDUSTRIAL APPLICABILITY

The switching power supply device and the semiconductor device of the present disclosure include the intermittent oscillation control capable of effectively reducing the audible noise generated from parts such as the transformer and the ceramic capacitor, and can realize the switching power supply device in which the control does not become unstable even when there is load fluctuation with a relatively simple circuit configuration.

Further, the switching power supply device and the semiconductor device of the present disclosure can be used in switching power supply devices such as an AC-DC converter and a DC-DC converter built in various electronic devices and an external AC adapter, and the like.

What is claimed is:

1. A switching power supply device, comprising:
an energy conversion circuit to which an input voltage is input, the input voltage being a direct current input voltage;
a rectifying and smoothing circuit that rectifies and smooths a voltage output from the energy conversion circuit, and outputs an output voltage to a load;
a switching element connected to the energy conversion circuit, the switching element switching the input voltage;
a switching control circuit that controls switching operation of the switching element; and
an output state detection circuit that outputs a feedback signal in accordance with one of the output voltage and an output current flowing through the load, wherein:
the switching control circuit includes an intermittent oscillation control circuit that performs intermittent oscillation control in which a cycle including an oscillation time period in which the switching element performs switching operation and a stop time period in which the switching operation stops is repeated in accordance with the feedback signal so that one of the output voltage and the output current becomes constant, and
the intermittent oscillation control circuit includes a first comparator that determines whether the oscillation time period is to be started, according to the feedback signal, and a second comparator that compares an intermittent oscillation period that is a sum of the oscillation time period and the stop time period with a target period that is preset, sets the oscillation time period of a current cycle to a length obtained by extending the oscillation time period of a previous cycle by a first predetermined time when the intermittent oscillation period is shorter than the target period, and sets the oscillation time period of the current cycle to a length obtained by subtracting a second predetermined time from the oscillation time period of the previous cycle when the intermittent oscillation period is longer than the target period, in each cycle of the intermittent oscillation control.

2. The switching power supply device according to claim 1, wherein:
the intermittent oscillation control circuit sets the oscillation time period of the current cycle by comparing, by using the second comparator, a voltage of a capacitive element that is charged or discharged from start of the oscillation time period of the current cycle and an oscillation time period setting voltage; and
the oscillation time period setting voltage increases or decreases from a voltage value of the capacitive element stored when the oscillation time period of the previous cycle terminates by a predetermined voltage amount corresponding to one of the first predetermined time and the second predetermined time.

3. The switching power supply device according to claim 1, wherein one of the first predetermined time and the second predetermined time is set within a range of from ½ times to two times a switching operation period of the switching element.

4. The switching power supply device according to claim 1, wherein one of the first predetermined time and the second predetermined time is set in accordance with a count amount of the number of times of the switching operation of the switching element.

5. The switching power supply device according to claim 4, wherein the count amount is one.

6. The switching power supply device according to claim 1, wherein the intermittent oscillation control circuit includes an intermittent oscillation period modulator that periodically changes the intermittent oscillation period within a range of from a first period to a second period.

7. The switching power supply device according to claim 6, wherein the intermittent oscillation period modulator periodically changes the target period within a range of from a third period to a fourth period that are preset.

8. The switching power supply device according to claim 7, wherein:
   the intermittent oscillation period modulator changes the target period each time the intermittent oscillation period reaches the target period; and
   the target period is alternately changed to one of the third period and the fourth period.

9. The switching power supply device according to claim 6, wherein the intermittent oscillation period modulator periodically changes a threshold value for setting a peak value of current flowing through the switching element within a range of from a first threshold value to a second threshold value that are preset.

10. A semiconductor device for the switching power supply device according to claim 1, the semiconductor device comprising:
    a semiconductor substrate; and
    the switching control circuit in the switching power supply device disposed as an integrated circuit on the semiconductor substrate.

11. A semiconductor device for controlling a switching element connected to an energy conversion circuit, the semiconductor device comprising:
    a semiconductor substrate; and
    a switching control circuit that controls switching operation of a switching element and is disposed as an integrated circuit on the semiconductor substrate, wherein:
    the switching control circuit includes an intermittent oscillation control circuit that performs intermittent oscillation control in which a cycle including an oscillation time period in which the switching element performs switching operation and a stop time period in which the switching operation stops is repeated in accordance with a feedback signal output from an output state detection circuit in accordance with one of the output voltage and an output current flowing through a load so that one of an output voltage of a rectifying and smoothing circuit and the output current becomes constant, and
    the intermittent oscillation control circuit includes a first comparator that determines whether the oscillation time period is to be started, according to the feedback signal, and a second comparator that compares an intermittent oscillation period that is a sum of the oscillation time period and the stop time period with a target period that is preset, sets the oscillation time period of a current cycle to a length obtained by extending the oscillation time period of a previous cycle by a first predetermined time when the intermittent oscillation period is shorter than the target period, and sets the oscillation time period of the current cycle to a length obtained by subtracting a second predetermined time from the oscillation time period of the previous cycle when the intermittent oscillation period is longer than the target period.

* * * * *